(12) United States Patent
Flotkoetter et al.

(10) Patent No.: US 11,639,181 B2
(45) Date of Patent: May 2, 2023

(54) LEAD VEHICLE BRAKING WARNING SYSTEM

(71) Applicant: NISSAN NORTH AMERICA, INC., Franklin, TN (US)

(72) Inventors: Robert Flotkoetter, Novi, MI (US); Lawrence Pavey, Murfreesboro, TN (US); Lawrence Smythe, South Lyon, MI (US); Tyler Szymkowski, Jackson, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 38 days.

(21) Appl. No.: 17/489,709

(22) Filed: Sep. 29, 2021

(65) Prior Publication Data

US 2023/0094348 A1    Mar. 30, 2023

(51) Int. Cl.
*B60W 50/14* (2020.01)
*B60W 40/105* (2012.01)
(Continued)

(52) U.S. Cl.
CPC ............ *B60W 50/14* (2013.01); *B60K 35/00* (2013.01); *B60K 37/02* (2013.01); *B60W 40/105* (2013.01);
(Continued)

(58) Field of Classification Search
CPC ............ B60W 50/14; B60W 40/105; B60W 2554/80; B60W 2050/146; B60K 35/00; B60K 37/02; B60K 2370/349; B60K 2370/178; B60K 2370/176; B60K 2370/188; B60K 2370/1868
See application file for complete search history.

(56) References Cited

U.S. PATENT DOCUMENTS

| 7,077,549 B1 | 7/2006 | Corliss |
| 7,668,638 B2 * | 2/2010 | Saeki ................ B60W 10/06 701/96 |

(Continued)

FOREIGN PATENT DOCUMENTS

| CN | 208036094 U | * 11/2018 | |
| EP | 2277756 A2 | * 1/2011 | ........... B60K 28/066 |

(Continued)

*Primary Examiner* — Chico A Foxx
(74) *Attorney, Agent, or Firm* — Global IP Counselors, LLP

(57) ABSTRACT

A lead vehicle braking warning system includes a speed sensor, a detector, a display and an electronic controller. The speed sensor measures current speed of a host vehicle. The detector detects current speed of a lead vehicle relative to the speed of the host vehicle. The display has a braking condition display area configured to display each of a plurality of braking conditions of the lead vehicle for the operator of the host vehicle. The electronic controller is in electronic communication with the speed sensor, the detector and the display. The electronic controller determines whether or not the lead vehicle is currently decelerating and determine which one of a plurality of braking conditions is currently being experienced by the lead vehicle and display information identifying the current one of the plurality of braking conditions of the lead vehicle within the braking condition display area of the display.

18 Claims, 19 Drawing Sheets

(51) Int. Cl.
B60K 35/00 (2006.01)
B60K 37/02 (2006.01)

(52) U.S. Cl.
CPC .. *B60K 2370/176* (2019.05); *B60K 2370/178* (2019.05); *B60K 2370/188* (2019.05); *B60K 2370/1868* (2019.05); *B60K 2370/349* (2019.05); *B60W 2050/146* (2013.01); *B60W 2554/80* (2020.02)

(56) References Cited

U.S. PATENT DOCUMENTS

| | | | |
|---|---|---|---|
| 8,854,198 | B2 | 10/2014 | Tengler et al. |
| 10,040,351 | B2* | 8/2018 | Nishizaki ............... B60K 37/02 |
| 2004/0085197 | A1* | 5/2004 | Watanabe ........... B60W 40/064 |
| | | | 701/96 |
| 2007/0008095 | A1* | 1/2007 | Gwinn .................. B60Q 1/444 |
| | | | 340/476 |
| 2007/0021876 | A1* | 1/2007 | Isaji .................... B60W 10/184 |
| | | | 701/1 |
| 2009/0207043 | A1* | 8/2009 | Shaffer .................. G08G 1/161 |
| | | | 340/903 |
| 2011/0057786 | A1 | 3/2011 | Giddens |
| 2015/0148985 | A1* | 5/2015 | Jo ........................ B60W 30/095 |
| | | | 701/1 |
| 2018/0137380 | A1* | 5/2018 | Alrefai .................. B60Q 9/008 |
| 2019/0061763 | A1* | 2/2019 | Takeda .................. B60W 10/18 |
| 2019/0276013 | A1* | 9/2019 | Kim ..................... G06V 20/588 |
| 2019/0337533 | A1* | 11/2019 | Kume .................. B60W 50/14 |
| 2020/0148229 | A1* | 5/2020 | Meyer ...................... B60T 7/12 |
| 2020/0384964 | A1* | 12/2020 | Lewandowski ........... B60T 7/22 |

FOREIGN PATENT DOCUMENTS

| | | | | |
|---|---|---|---|---|
| EP | 2388160 | A1 * | 11/2011 | ............ B60W 30/16 |
| GB | 2325553 | A  * | 11/1998 | ............... B60Q 1/22 |
| WO | WO-2009044217 | A1 * | 4/2009 | ............. B60Q 1/444 |

* cited by examiner

LEAD VEHICLE BRAKING WARNING SYSTEM

BACKGROUND

Technical Field

The present disclosure generally relates to a lead vehicle braking warning system. More specifically, the present disclosure relates to a lead vehicle braking warning system installed within a host vehicle that detects relative speed of a lead vehicle (a vehicle in front of the host vehicle), determines whether or not the lead vehicle is undergoing a braking condition, and provide a signal or image to the operator of the host vehicle warning the operator of the braking condition.

Background Information

Basically, all street legal vehicles are required to include brake warning lights in their taillamp assemblies. Such brake warning lights have two settings: off or on. When the brake warning lights are off, this is an indication that the brakes not in use. When the brake warning lights are on, this is an indication that the vehicle operator has his or her foot on the brake pedal and is trying to decelerate.

SUMMARY

One object of the present disclosure is to provide a host vehicle with a visible warning image that indicates, first, whether or not a lead vehicle is currently braking (decelerating) and second, to indicate the type of deceleration the lead vehicle is currently experiencing, such as a light deceleration (light braking condition), more aggressive braking (medium braking) or rapid deceleration (hard braking).

In view of the state of the known technology, one aspect of the present disclosure is to provide a lead vehicle braking warning system, a host vehicle, a speed sensor, a detector, a display and an electronic controller. The speed sensor is installed to the host vehicle measuring current speed of the host vehicle. The detector is installed to the host vehicle that detects current speed of a lead vehicle relative to the speed of the host vehicle, the lead vehicle being located forward of the host vehicle. The display is installed to the host vehicle within view of a vehicle operator. The display has a braking condition display area configured to display each of a plurality of braking conditions of the lead vehicle. The electronic controller is installed to the host vehicle and is in electronic communication with the speed sensor, the detector and the display. The electronic controller is configured to determine acceleration/deceleration of the lead vehicle and determine whether or not the lead vehicle is currently decelerating at a rate corresponding to one of the plurality of braking conditions of the lead vehicle. The electronic controller is further configured to determine which one of the plurality of braking conditions is currently being experienced by the lead vehicle and display information identifying the one of the plurality of braking conditions of the lead vehicle within the braking condition display area.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
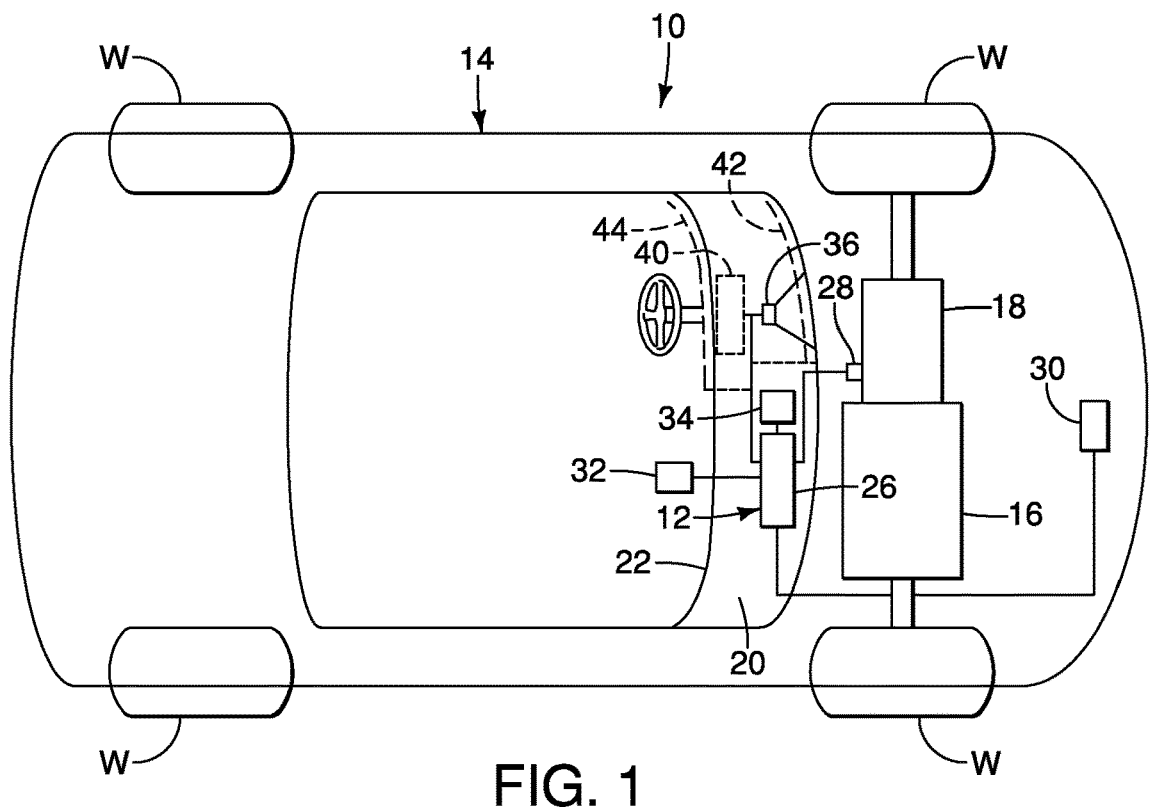
FIG. 1 is a schematic view of a host vehicle that includes a lead vehicle braking warning system in accordance with a first embodiment.
Figure 2:
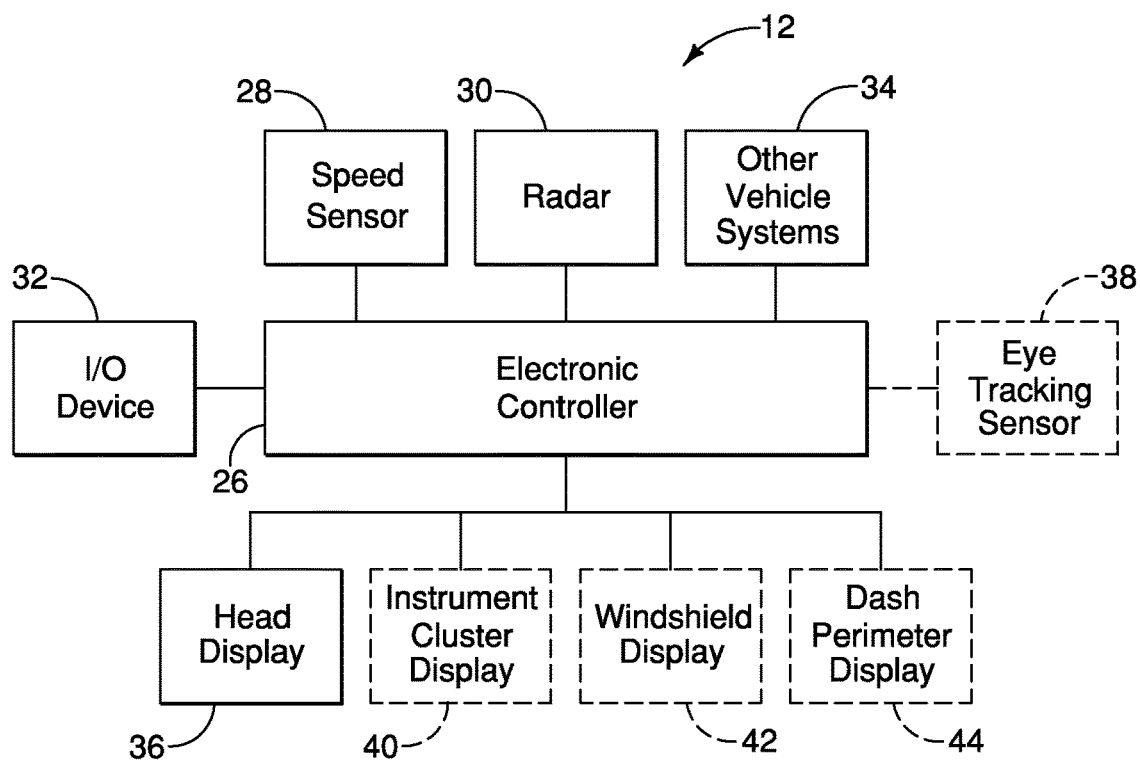
FIG. 2 is a block diagram of the various elements of the lead vehicle braking warning system including, among other features, an electronic controller, a speed sensor, radar device and various displays that display braking conditions of a lead vehicle in accordance with the first embodiment.

Referring initially to FIGS. 1 and 2, a vehicle 10 that includes a lead vehicle braking warning system 12 is illustrated in accordance with a first embodiment. The host vehicle 10 is hereinafter referred to as the host vehicle 10.

The host vehicle 10 includes many conventional vehicle components such as, for example, a vehicle body structure 14, a power plant 16, a transmission 18 with associated drive train components (not shown), brakes (not shown), steering components (not shown), wheels W, a windshield 20, a dashboard 22 and the lead vehicle brake warning system 12. The lead vehicle brake warning system 12 is hereinafter referred to as the brake warning system 12.

The power plant 16 can include any of a variety of power sources, such as an internal combustion engine, an electric motor or a hybrid system with both electric motor and internal combustion engine. The transmission 18 can be a manual or automatic transmission. The windshield 20 is installed to an opening of the vehicle body structure 14 above the dashboard 22 in a conventional manner. The dashboard 22 extends the width of the interior of the passenger compartment of the vehicle body structure 14 adjacent to and below the windshield 20. The dashboard 22 includes an instrument cluster 25 that includes, for example, a conventional speedometer and a conventional tachometer.

As shown in FIGS. 1 and 2, the braking warning system 12 includes various components such as an electronic controller 26, a speed senor 28, a radar device 30, an input/output device 32, other vehicle control systems 34 and an HUD 36 (aka, a head-up display 36 projected to and reflected off the windshield 20 of the host vehicle 10). In alternative embodiments, the brake warning system 12 can further include an eye tracking sensor 38, an instrument cluster display 40, a windshield display 42 and/or a dash perimeter display 44.

As shown in FIG. 2, the electronic controller 26 is connected to the speed sensor 28, the radar device 30, the input/output device 32, various other vehicle control systems 34, the HUD 36, and optionally or alternatively connected to the eye tracking sensor 38 (FIG. 2 only), the instrument cluster display 40, the windshield display 42 and/or the dash perimeter display 44. The electronic controller 26 can be connected to each of the above mentioned sensors and components via direct electrical wiring, or, via wireless communication such as, for example, BlueTooth®, wife, or any of a variety of radio frequency communication protocols.

The electronic controller 26 preferably includes a microcomputer with a brake warning control program that controls the various displays, and more specifically, the various braking condition display areas, as discussed herein. The electronic controller 26 can also include other conventional components such as an input interface circuit, an output interface circuit, and storage devices such as a ROM (Read Only Memory) device and a RAM (Random Access Memory) device. The microcomputer of the electronic controller 26 is programmed to evaluate received data and information from the connected sensors and systems control the various displays, and more specifically, the content and images displayed in the various braking condition display areas. The electronic controller 26 is operatively coupled to the various sensors and systems shown in FIGS. 2 and 3 in a conventional manner. The internal RAM of the electronic controller 26 stores statuses of operational flags and various control data. The internal ROM of the electronic controller 26 stores communication protocols and operational details and data for various operations.

The speed sensor 28 is installed to, for example, an output portion of the transmission 18 and is configured to detect the current speed of the host vehicle 10 based on rotation of elements (not shown) within the transmission 18. It should be understood from the drawings and the description herein that the speed sensor 28 can be installed at any of a variety of locations on or within the host vehicle 10, such as at one or more of the wheels W. The speed sensor 28 measures the current speed of the host vehicle 10 and transmits corresponding information to the electronic controller 26.

The radar device 30 is typically installed to a forward area of the vehicle body structure 14 of the host vehicle 10. The radar device 30 is designed and configured to detect the current relative speed of a lead vehicle 50. As used herein, a lead vehicle (such as the lead vehicle 50) is a vehicle or vehicles in front or forward of the host vehicle 10. The lead vehicle (such as the lead vehicle 50) can be in the same lane as the host vehicle 10 or can be in a lane to the right or left of the lane the host vehicle 10 occupies (assuming a right land and/or a left lane is present on the road being traveled). The radar device 30 can be a radar device a sonar device or any similar device that can detect the speed of the lead vehicle 50 (or lead vehicles 50) relative to the speed of the host vehicle 10 in real time. The radar device 30 transmits the detected current relative speed of the lead vehicle 50 (relative to the host vehicle 10) to the electronic controller 26 at regular intervals at a rate that can be considered "real time" information. In other words, the regular intervals between relative speed updates from the radar device 30 to the electronic controller 26 are almost instantaneous. For example, some radar devices such as the radar device 30 can monitor relative distance and speed between the host vehicle 10 and the lead vehicle 50 at a rate that is between 24 GHz and 77 GHz. Similarly, the radar device 30 can send updated relative speed and distance data at similar rates to the electronic controller 26.

For the sake of simplicity, the following description focuses on only one lead vehicle 50 being present. However, it should be understood from the drawings and the description herein that the braking warning system 12 can detect changes in relative speeds of a plurality of lead vehicles 50 and can determine the relative speed of each of the lead vehicles 50 relative to the host vehicle 10. A brake warning image can be provided to the operator of the host vehicle 10 for any one or ones of the lead vehicles 50 currently decelerating at a rate that necessitates a warning to the operator of the host vehicle 50 in a manner described hereinbelow.

The input/output device 32 is a device connected to the electronic controller 16 and installed to, for example, the instrument cluster display 40, central area of the dashboard 22 or a center console (not shown). The input/output device 32 can include a touch screen display (not shown) and/or switches and rotatable electrical elements that allows a vehicle operator to select to operate, input data or parameters, or activate or shut-off various systems. For example, the input/output device 32 can include a switch (not shown) for activating or shut-off (de-activating) the braking warning system 12.

Other vehicle control systems 34 can include, for example, autonomous driving features, a FCW (Forward Collision Warning System), an AR (Augmented Reality System) and/or an AEB (Automatic Emergency Braking System). Since such systems are conventional systems well known in the art, therefore, further description of such systems is omitted for the sake of brevity.

Figure 3:
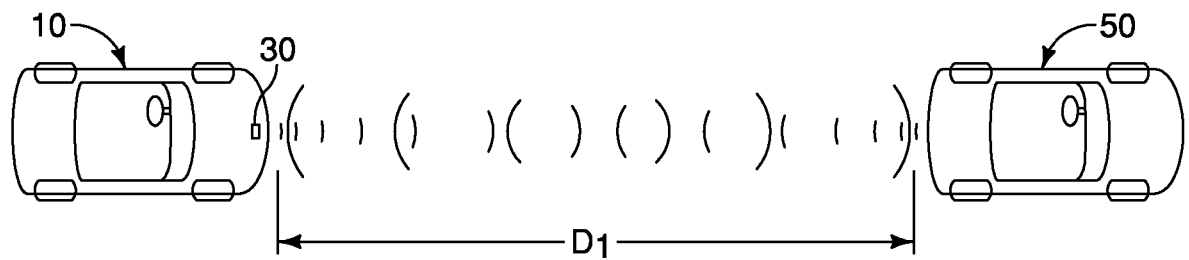
FIG. 3 is a schematic view of the host vehicle and the lead vehicle with the radar device of the host vehicle monitoring the speed and distance of the lead vehicle relative to the host vehicle in accordance with the first embodiment.

As shown in FIG. 3, the radar device 30 broadcasts signals (pulses or waves) in the direction of the lead vehicle 50. Reflected signals from the lead vehicle 50 are detected by the radar device 30 and used to determine a current distance Di between the host vehicle 10 and the lead vehicle 50, and, determine a current speed of the lead vehicle 50 relative to the current speed of the host vehicle 10. This information is transmitted to the electronic controller 26 and then processed by the electronic controller 26.

Figure 4:
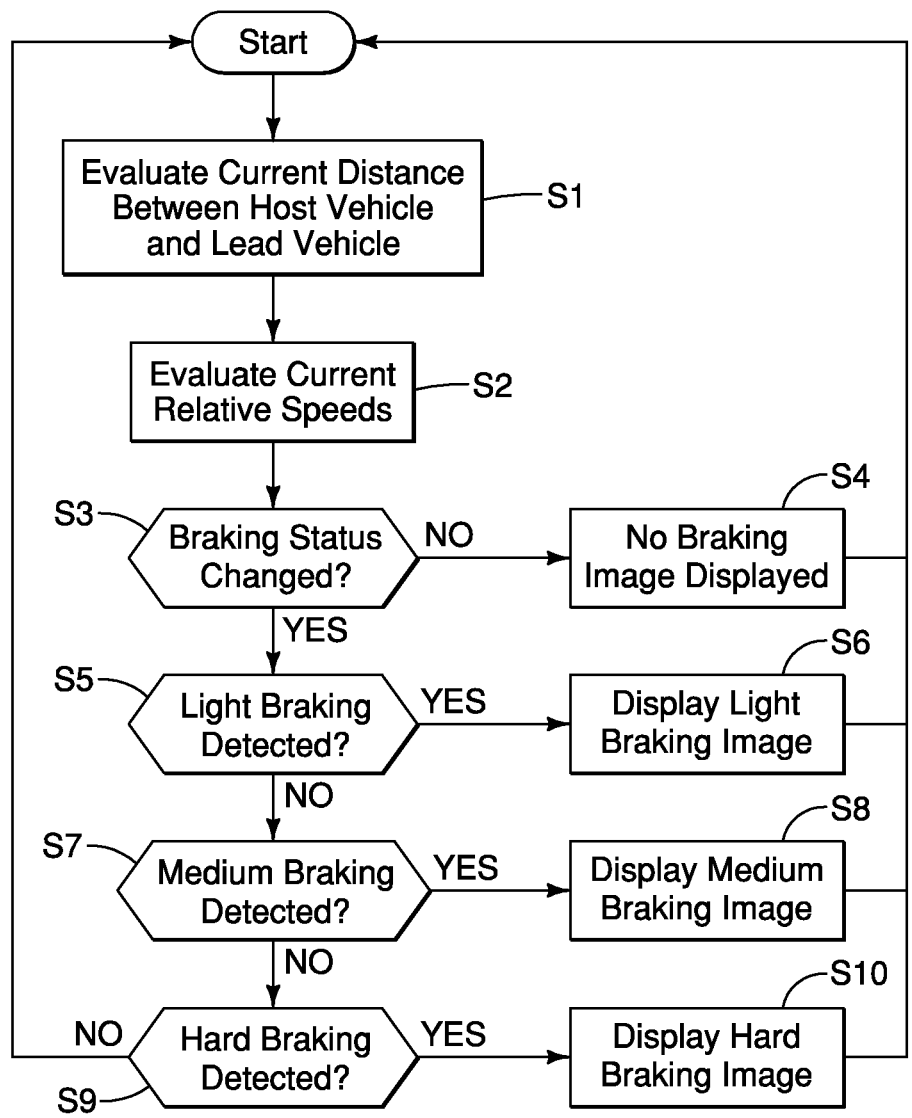
FIG. 4 is a flowchart showing basic operational steps performed by the electronic controller in determining whether or not the lead vehicle is decelerating at a light rate of deceleration, a medium rate of deceleration or a hard rate of deceleration and displaying on the display the appropriate braking image for a vehicle operator of the host vehicle, the braking condition images including a light braking image, a medium braking image and a hard braking image in accordance with the first embodiment.

FIG. 4 shows basic logic steps conducted by the electronic controller 26 in order to determine whether or not the lead vehicle 50 is braking or not, and if braking, the degree of the braking or deceleration (light, medium or hard). It should be understood from the drawings and the description herein that the degree of the braking or deceleration (light, medium or hard) and subsequent displaying of one of the plurality of braking condition images in the described embodiments, the electronic controller 26 operates in the absence of vehicle-to-vehicle communications. In other words, no communications are received by the electronic controller 26 from the lead vehicle 50 or any other vehicle. Alternatively, the electronic controller 26 can be connected to a vehicle communications network, cellular data communications and/or directly to other vehicles. In other words, vehicle-to-vehicle communications can be employed with the brake warning system 12 in alternative embodiments, as well as vehicle network communications for determining lead vehicle speeds.

As shown in a basic flowchart depicted in FIG. 4, after the Start box, at step S1, the electronic controller 26 evaluates the data recently received information from the speed sensor 28 and the radar device 30. The electronic controller 26 stores recently received data (the previous five to ten minutes of data) and evaluates over time and first determines the current distance Di (FIG. 3) between the host vehicle 10 and the lead vehicle 50. Next at step S2, the recently received data from the speed sensor 28 and the radar device 30 is further processed by the electronic controller 26 in order to determine the current speed of the lead vehicle 50 relative to the host vehicle 10, and further determine whether or not the lead vehicle 50 has made changes in its velocity (speed) relative to the host vehicle 10. In particular, the electronic controller 26 determines whether or not the lead vehicle 50 is decelerating and if so at what rate. If the lead vehicle 50 is decelerating, then the electronic controller 26 evaluates the deceleration of the lead vehicle 50 and determines to what degree the deceleration is occurring.

The determination of the degree of deceleration can include, for example, consideration of the current speed of the host vehicle 10 and the distance Di between the host vehicle 10 and the lead vehicle 50. The resulting determination includes designation of the lead vehicle 50 undergoing a light braking condition, a medium braking condition and a hard braking condition. The light braking condition can be considered to be a condition where the lead vehicle 50 is gradually slowing down relative to its current speed. If traveling at, for example, 60 mph, and the deceleration is a change of less than 10 mph in a 10 second period of time, then lead vehicle 50 is likely undergoing a light braking condition. If traveling at, for example, 60 mph, and the deceleration is a change of less than 15 mph in a 10 second period of time, then lead vehicle 50 is likely undergoing a medium braking condition. However, if traveling at, for example, 60 mph, and the deceleration is a change of greater than 15 mph in a 10 second period of time, then lead vehicle 50 is likely undergoing a hard braking condition.

It should be understood from the drawings and the description herein that the values given above for determining a light braking condition, a medium braking condition and a hard braking condition are mere examples of observable conditions. The values mentioned above are evaluated based upon many factors, such as the weight of the host vehicle 10, the current speed of the host vehicle 10 and the distance Di. If the host vehicle 10 is a large pick-up truck weighing several tons, then consideration must be made regarding the braking capability of the host vehicle 10. Similarly, the faster the host vehicle 10 is going, the longer it will take for the operator of the host vehicle 10 to react and take appropriate action in response to the notification of the braking condition of the lead vehicle 50. Further, the distance Di between the host vehicle 10 and the lead vehicle 50, can change the weight given to the deceleration rate in the evaluation of the current data when determining the braking orientation of the lead vehicle 50.

At step S3 in FIG. 4, the electronic controller 26 determines whether or not the braking status has changed. More specifically, at step S3, the electronic controller 26 determines whether or not the lead vehicle 50 is decelerating. If no, the operation moves to step S4 where no braking image is displayed for the operator of the host vehicle 10. In other words, if no braking of the lead vehicle 10 is detected, to braking image is displayed on the HUD 36. Operation then moves back to the Start box at the top of the flowchart of FIG. 4.

At step S3, if yes (braking status has changed), then the electronic controller 26 moves to step S5. At step S5, the electronic controller 26 determines whether or not the lead vehicle 50 is decelerating in a light braking condition. If yes, then operation moves to step S6 where a light braking image is displayed by the HUD 36 in a braking condition display area 36a (FIG. 5) where it can be observed by the operator of the host vehicle 10. Operation then moves back to the Start box at the top of the flowchart of FIG. 4.

At step S5, if no, then the electronic controller 26 moves to step S7. At step S7, the electronic controller 26 determines whether or not the lead vehicle 50 is decelerating in a medium braking condition. If yes, then operation moves to step S8 where a medium braking image is displayed by the HUD 36 in the braking condition display area 36a where it can be observed by the operator of the host vehicle 10. Operation then moves back to the Start box at the top of the flowchart of FIG. 4.

At step S7, if no, then the electronic controller 26 moves to step S9. At step S9, the electronic controller 26 determines whether or not the lead vehicle 50 is decelerating in a hard braking condition. If yes, then operation moves to step S10 where a hard braking image is displayed by the HUD 36 in the braking condition display area 36a where it can be observed by the operator of the host vehicle 10 where it can be observed by the operator of the host vehicle 10. Operation then moves back to the Start box at the top of the flowchart of FIG. 4.

The present invention includes various differing types of light braking images, medium braking images and hard braking images that are described herein below after description of various displays and various possible braking condition display areas, in addition to the above mentioned braking condition display area 36a.

Figure 5:
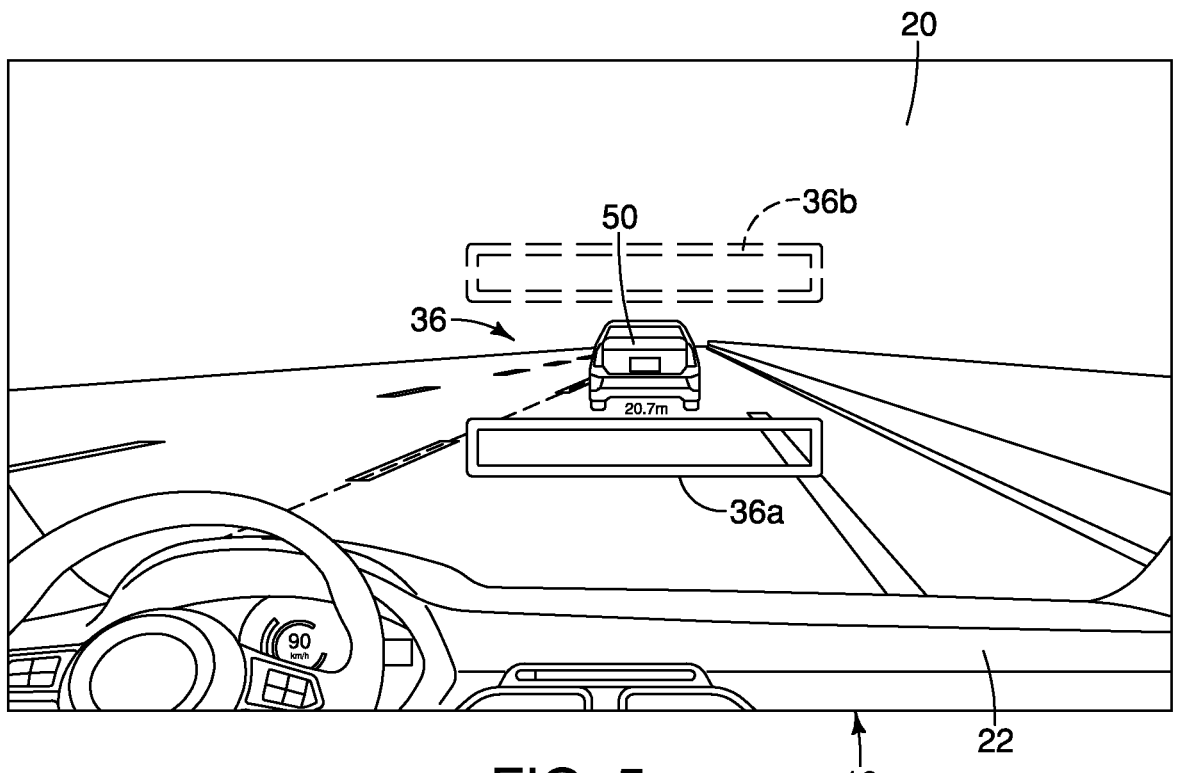
FIG. 5 is a schematic view of a head-up display (HUD) showing a first example of a braking condition display area and a second example of a braking condition display area where the HUD projector can project a selected one of the light braking image, the medium braking image and the hard braking image in accordance with the first embodiment.

As shown in FIG. 5, the HUD 36 is basically a projection unit that projects images onto the windshield 20. The images reflect off the interior surface of the windshield 20 and are visible to the vehicle operator (not shown) seated behind the steering wheel. The HUD 36 (the projector) is configured to display images based on communications from the electronic controller 26 in accordance with the logic set forth in the flowchart in FIG. 4.

Figure 6:
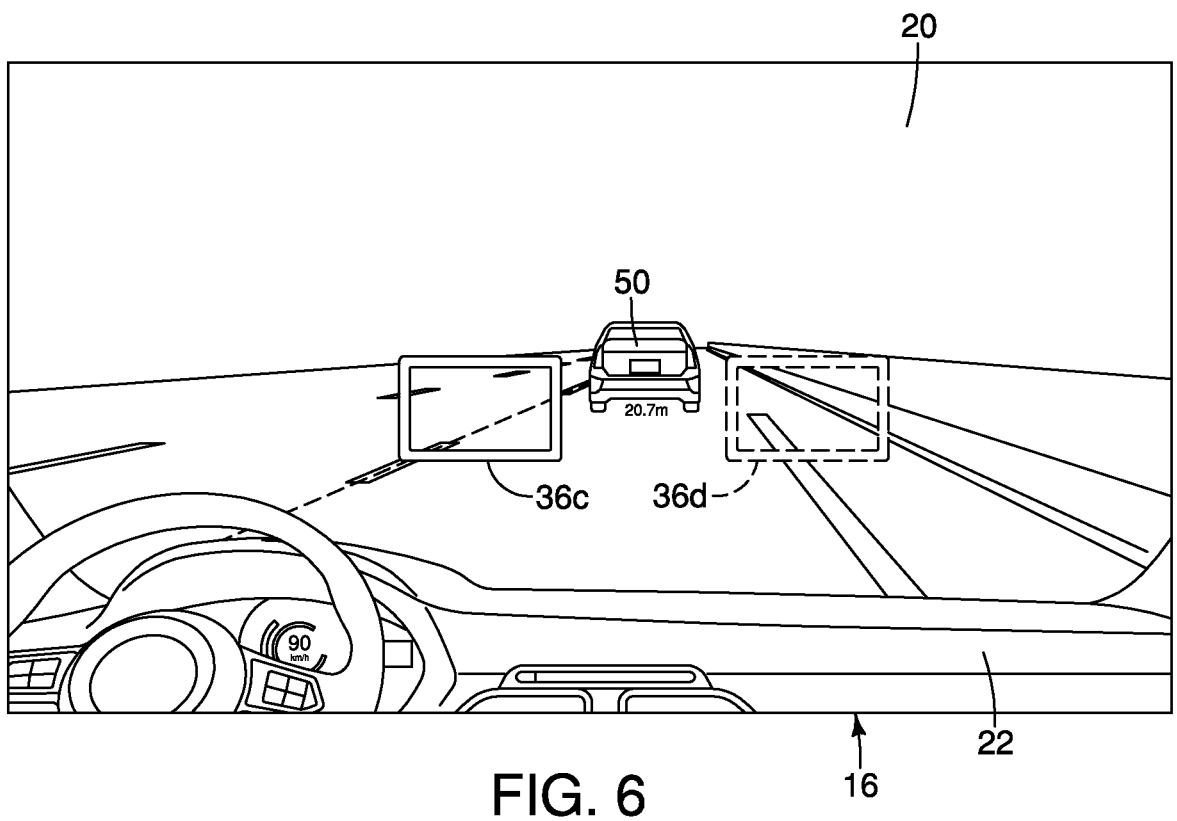
FIG. 6 is another schematic view of the head-up display (HUD) depicted in FIG. 5 showing a third example of a braking condition display area and a fourth example of a braking condition display area where the HUD projector can project the selected one of the light braking image, the medium braking image and the hard braking image in accordance with the first embodiment.

The HUD 36 is configured to project the images to the braking condition display area 36a, as shown in FIG. 5. Alternatively, another braking condition display area 36b (in phantom lines in FIG. 5) can be displayed on the windshield 20. Still further, FIG. 6 shows a braking condition display area 36c and a braking condition display area 36d. The electronic controller 26 and the HUD 36 can be configured to display a braking condition image in any one of the braking condition display areas 36a, 36b, 36c and 36d. Still further, using the input/output device 32, it is possible for the vehicle operator (not shown) to select which of the braking condition display areas 36a, 36b, 36c and 36d is to be used to display braking condition images. Each of the braking condition display areas 36a, 36b, 36c and 36d are within view of the vehicle operator.

As shown in FIG. 5, the HUD 36 and electronic controller 26 are configured such that the braking condition display area 36a is positioned on the windshield 20 at a location approximately beneath the lead vehicle 50. Also, the braking condition display area 36b is positioned on the windshield 20 approximately above the lead vehicle 50.

As shown in FIG. 6, the braking condition display area 36c is positioned on the windshield 20 to the left of the lead vehicle 50 and the braking condition display area 36d is positioned on the windshield 20 to the left of the lead vehicle 50.

Figure 7:
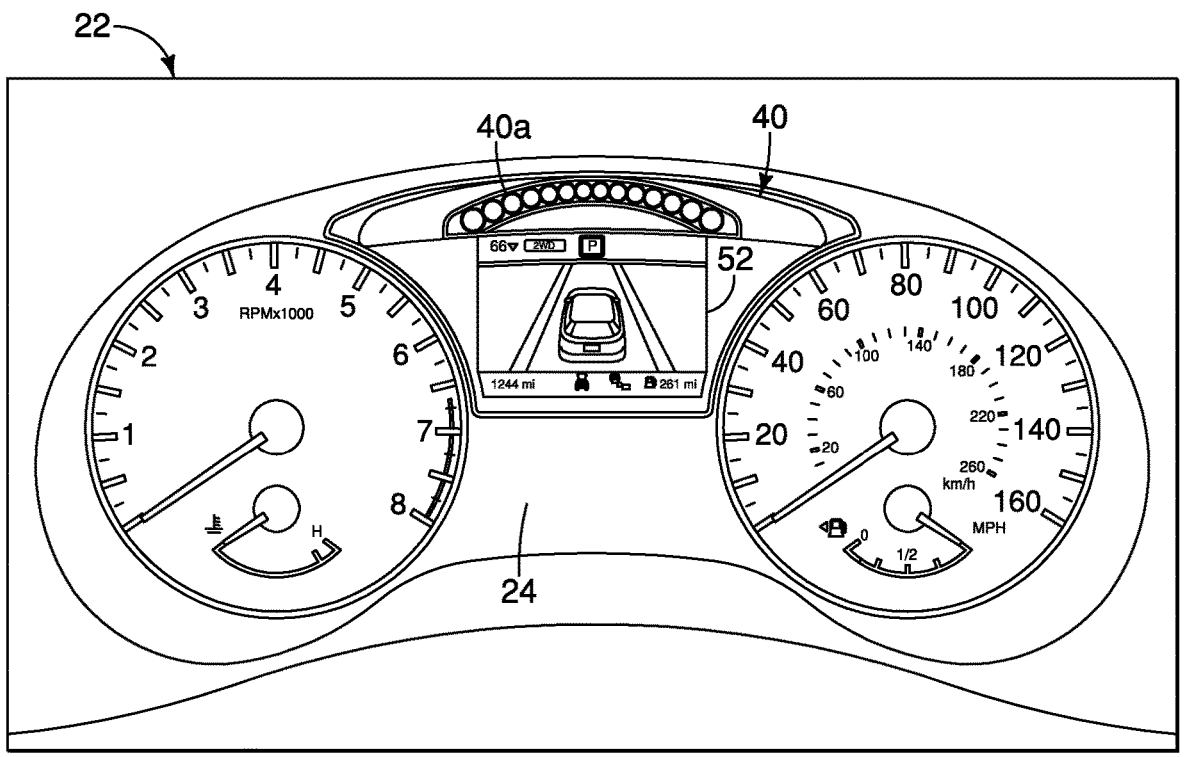
FIG. 7 is a view of an instrument cluster installed to a dashboard of the host vehicle, the instrument cluster having a display that includes a fifth example of a braking condition display area where the HUD projector can project the selected one of the light braking image, the medium braking image and the hard braking image in accordance with the first embodiment.
Figure 8:
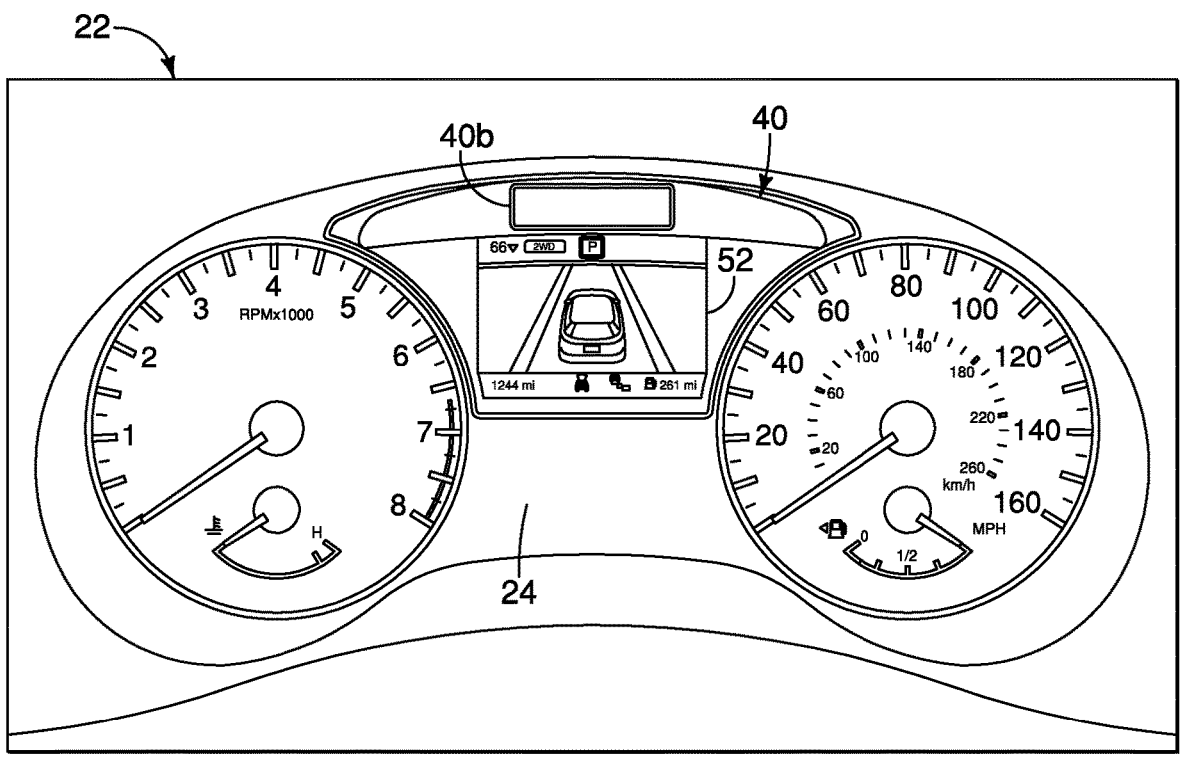
FIG. 8 is another view of the instrument cluster depicted in FIG. 7, the display of instrument cluster including a sixth example of a braking condition display area where the HUD projector can project the selected one of the light braking image, the medium braking image and the hard braking image in accordance with the first embodiment.
Figure 9:
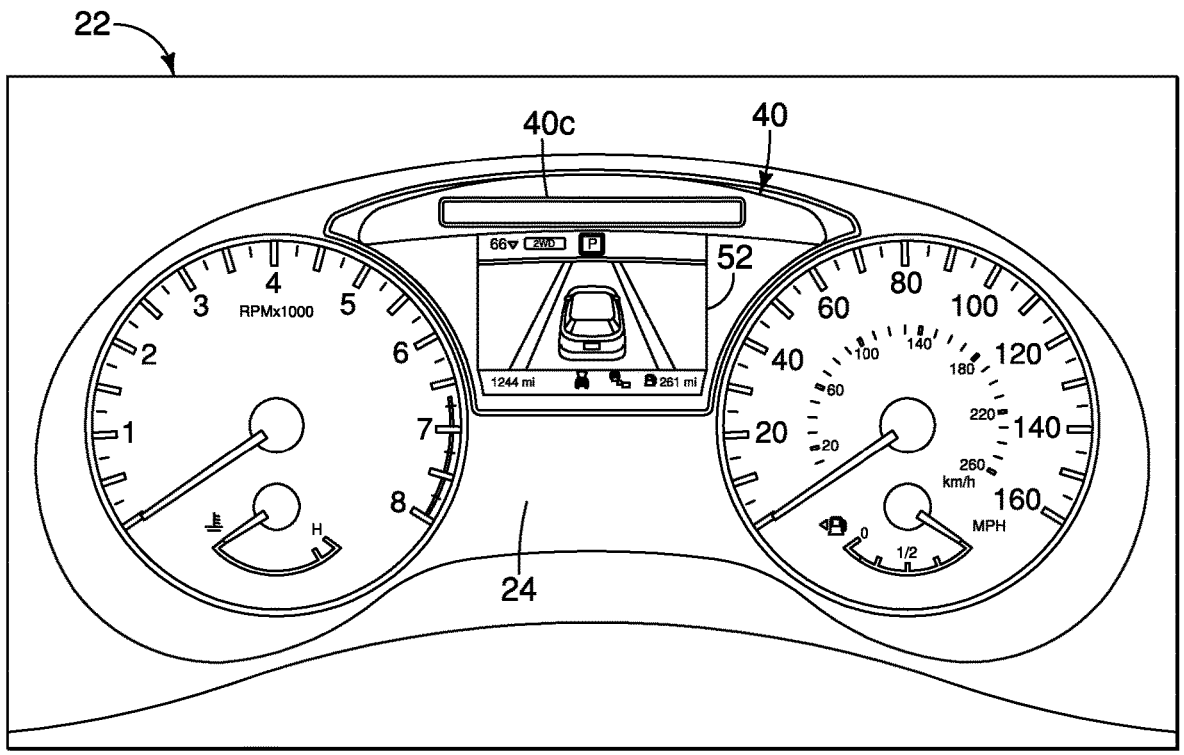
FIG. 9 is yet another view of the instrument cluster depicted in FIGS. 7 and 8, the display of instrument cluster including a seventh example of a braking condition display area where the HUD projector can project the selected one of the light braking image, the medium braking image and the hard braking image in accordance with the first embodiment.
Figure 10:
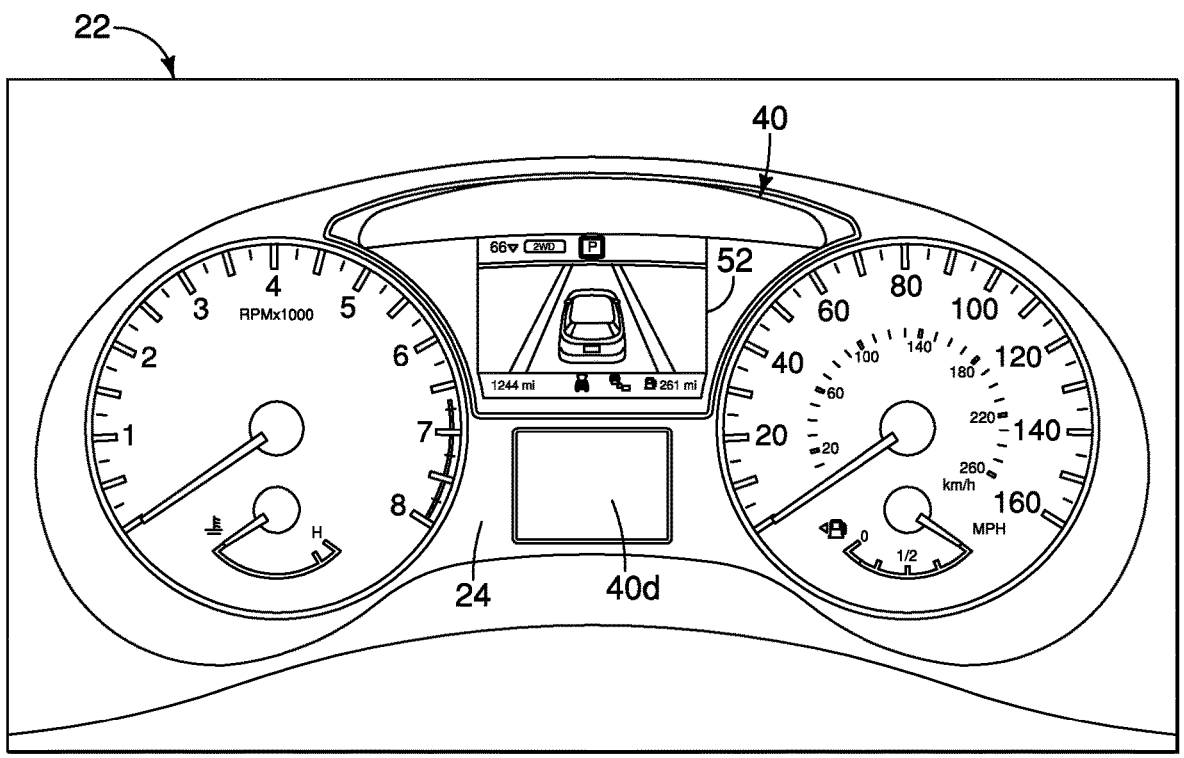
FIG. 10 is still another view of the instrument cluster of the instrument cluster depicted in FIGS. 7-9, the display of instrument cluster including an eighth example of a braking condition display area where the HUD projector can project the selected one of the light braking image, the medium braking image and the hard braking image in accordance with the first embodiment.

As shown in FIG. 7, in an alternative configuration, the instrument cluster 40 installed to the dashboard 22 of the host vehicle 10 includes a display that defines a braking condition display area 40a having an arcuate shape that is located above a host vehicle status display area 52. Still further, as shown in FIG. 8, the display of the instrument cluster 40 can also define another braking condition display area 40b that is rectangular shaped and located above the host vehicle status display area 52. FIG. 9 shows the display of the instrument cluster 40 defining a braking condition display area 40c that has a long narrow rectangular shape located above and adjacent to the host vehicle status display area 52. FIG. 10 shows the display of the instrument cluster 40 defining a braking condition display area 40d that is rectangular shaped and is located below the host vehicle status display area 52.

The electronic controller 26 and the display of the instrument panel 40 can be configured to display a braking condition image in any one of the braking condition display areas 40a, 40b, 40c and 40d. Still further, using the input/output device 32, it is possible for the vehicle operator (not shown) to select which of the braking condition display areas 40a, 40b, 40c and 40d is to be used to display braking condition images. Each of the braking condition display areas 40a, 40b, 40c and 40d are within view of the vehicle operator.

Figure 11:
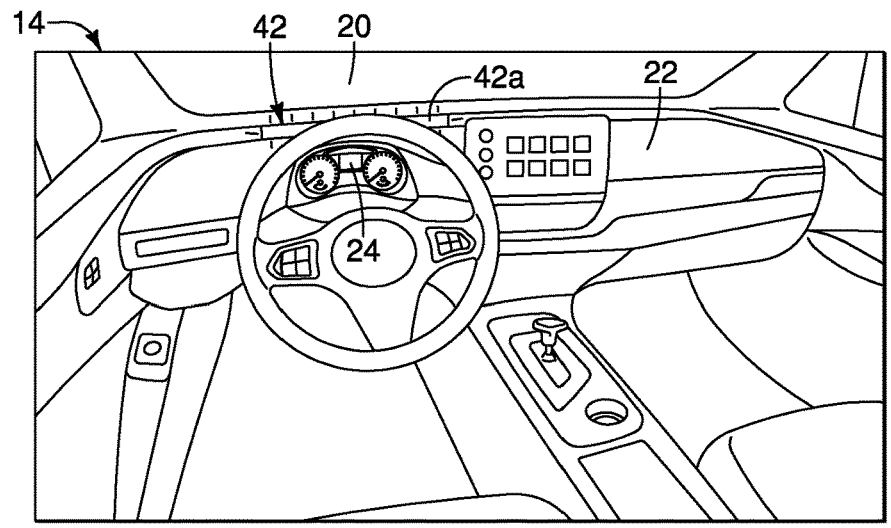
FIG. 11 is a perspective view of the dashboard, windshield and instrument cluster of the host vehicle showing a display below the windshield along an upper edge of the dashboard that defines a ninth example of a braking condition display area for displaying a selected one of the light braking image, the medium braking image and the hard braking image in accordance with the first embodiment.
Figure 12:
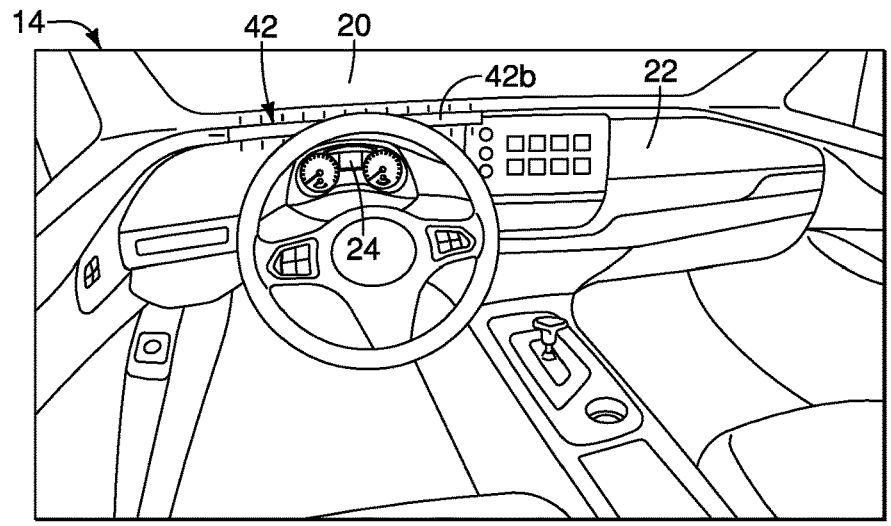
FIG. 12 is a perspective view of the dashboard, windshield and instrument cluster of the host vehicle depicted in FIG. 11 showing a display below the windshield along an upper edge of the dashboard that defines a tenth example of a braking condition display area for displaying a selected one of the light braking image, the medium braking image and the hard braking image, the display in FIG. 12 being longer than the display depicted in FIG. 11 in accordance with the first embodiment.
Figure 13:
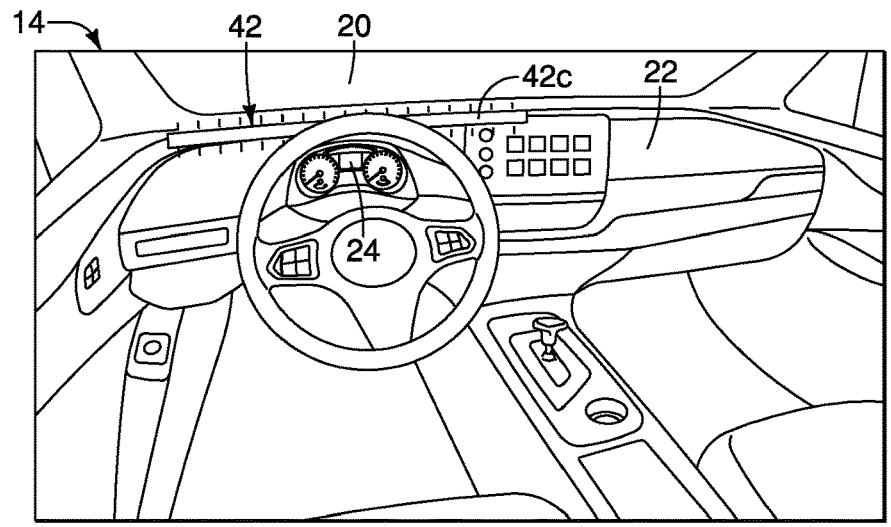
FIG. 13 is a perspective view of the dashboard, windshield and instrument cluster of the host vehicle depicted in FIGS. 11 and 12 showing a display below the windshield along an upper edge of the dashboard that defines an eleventh example of a braking condition display area for displaying a selected one of the light braking image, the medium braking image and the hard braking image, the display in FIG. 13 being longer than the display depicted in FIGS. 11 and 12 in accordance with the first embodiment.

As shown in FIG. 11, in another alternative configuration, an upper area of the dashboard 22 of the host vehicle 10 immediately below the windshield 20 includes a display 42 that defines a braking condition display area 42a. The braking condition display area 42a has a curved contour corresponding to the shape of a bottom edge of the windshield 20. The braking condition display area 42a has a first overall length that extends approximately the diameter of the steering wheel of the vehicle 10. Alternatively, as shown in FIG. 12, the display 42 can define a braking condition display area 42b having a second overall length that is greater than the first overall length of the braking condition display area 42a. Still further as shown in FIG. 13, the display 42 can define a braking condition display area 42c having a third overall length that is greater than the second overall length of the braking condition display area 42b.

Figure 14:
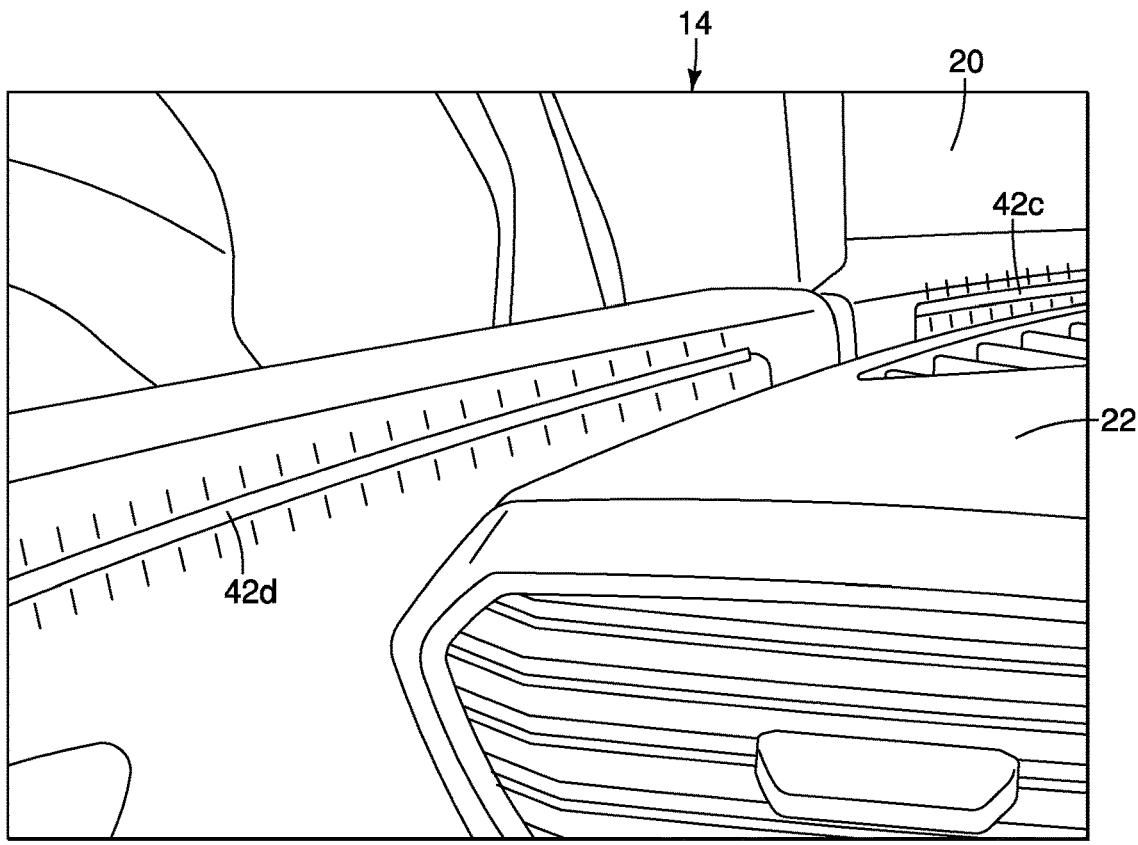
FIG. 14 is a perspective view of a driver's side door, a portion of the dashboard and windshield of the host vehicle depicted in FIG. 13 showing an extension of the display depicted in FIG. 13, where the extension of the display is installed an upper area of a door trim panel in accordance with the first embodiment.
Figure 15:
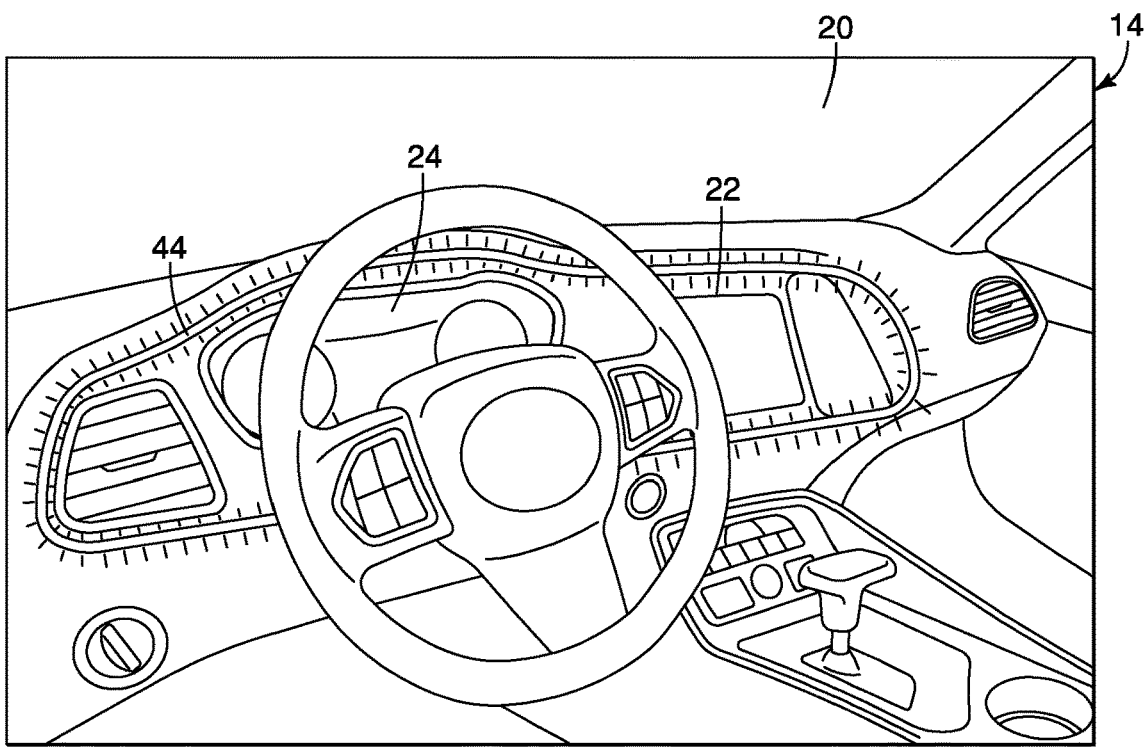
FIG. 15 is a perspective view of the dashboard, windshield and instrument cluster of the host vehicle showing a display installed to a contoured portion of the dashboard extending around the instrument cluster defines a twelfth example of a braking condition display area for displaying a selected one of the light braking image, the medium braking image and the hard braking image in accordance with the first embodiment.

Further, as shown in FIG. 14, the display 42 can extend along an upper area of the driver's door at the base of the window opening, defining a braking condition display area 42d. The braking condition display area 42d can be an extension of the braking condition display area 42c or can be an independently controlled braking condition display area.

A further display 44 can be installed along a portion of the dashboard 22 that surrounds the instrument cluster 24 and other portions of the dashboard 22. The display 44 is a braking condition display area.

Additionally, the A-pillar to the left of the windshield 20 in FIGS. 11-13 can alternatively be provided with a braking condition display area, where the braking condition display area is defined by a plurality of illumination parts such as the illumination parts 54 and 56 (described below). Further, another braking condition display area can be provided within the passenger compartment above the windshield 20 along a lower edge of the headliner of the passenger compartment.

There are various braking condition images that correspond to no braking condition of the lead vehicle 50, a light braking condition of the lead vehicle 50, a medium braking condition of the lead vehicle 50 and a hard braking condition of the lead vehicle 50. Various embodiments of the images are described herein below. Each embodiment has a no braking image, a light braking image, a medium braking image and a hard braking image.

Figure 16A:
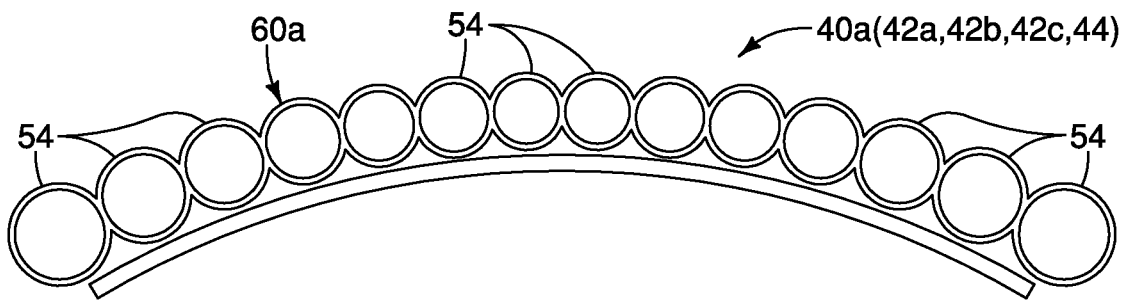
FIG. 16a is a schematic diagram showing a no braking image of a first set of braking condition images that, in response to evaluation of data, can be selected by the electronic controller for display in one or more of the above described braking condition display areas in accordance with the first embodiment.
Figure 16B:
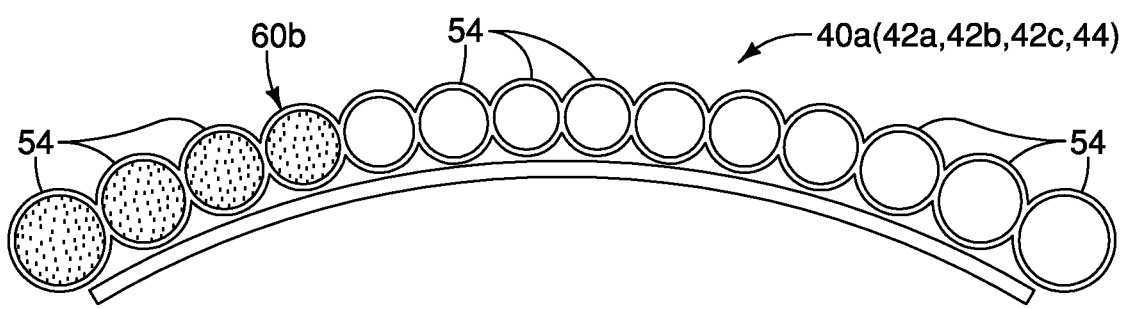
FIG. 16b is a schematic diagram showing a light braking image of the first set of braking condition images that, in response to evaluation of data, can be selected by the electronic controller for display in one or more of the above described braking condition display areas in accordance with the first embodiment.
Figure 16C:
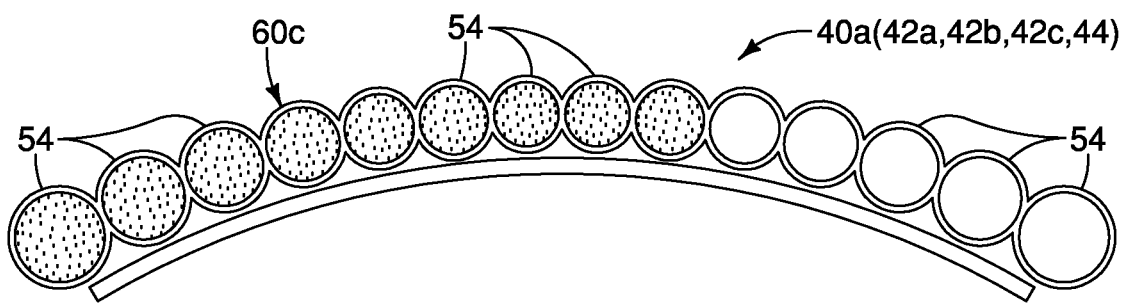
FIG. 16c is a schematic diagram showing a medium braking image of the first set of braking condition images that, in response to evaluation of data, can be selected by the electronic controller for display in one or more of the above described braking condition display areas in accordance with the first embodiment.
Figure 16D:
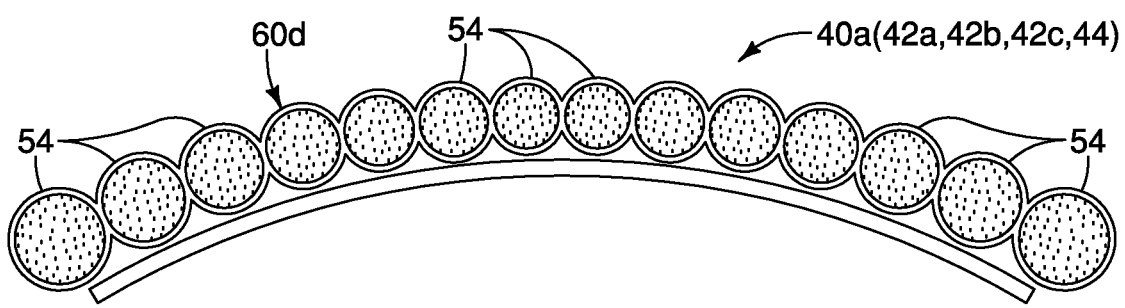
FIG. 16d is a schematic diagram showing a hard braking image of the first set of braking condition images that, in response to evaluation of data, can be selected by the electronic controller for display in one or more of the above described braking condition display areas in accordance with the first embodiment.

A description of a first set of braking condition images is now provided with initial reference to FIGS. 16a through 16d. FIG. 16a shows an array of illumination parts 54, each individual illumination part having a circular shape. The array of illumination parts 54 define a curved shape. In FIG. 16a, the illumination parts 54 are not illuminated defining a no braking image 60a that corresponds to step S4 in FIG. 4 where the electronic controller 26 has determined that the lead vehicle 50 is not currently decelerating and therefore no braking is detected. In FIG. 16b, four of the illumination parts 54 at the left of the array of illumination parts 54 are illuminated defining a light braking image 60b that corresponds to step S6 in FIG. 4 where the electronic controller 26 has determined that the lead vehicle 50 is currently gradually decelerating corresponding to a light braking condition. In FIG. 16c, eight or nine of the illumination parts 54 beginning at the left of the array of illumination parts 54 are illuminated defining a medium braking image 60c that corresponds to step S8 in FIG. 4. In step S8 the electronic controller 26 has determined that the lead vehicle 50 is currently decelerating at a rate corresponding to a medium braking condition. In FIG. 16d, all of the illumination parts 54 of the array of illumination parts 54 are illuminated defining a hard braking image 60d that corresponds to step S10 in FIG. 4 where the electronic controller 26 has determined that the lead vehicle 50 is currently rapidly decelerating corresponding to a hard braking condition.

The no braking image 60a, the light braking image 60b, the medium braking image 60c and the hard braking image 60d can be displayed in any of the braking condition display areas 40a, 42a, 42b, 42c and 44 as controlled by the electronic controller 26. Specifically, each of the braking condition display areas 40a, 42a, 42b, 42c and 44 has a curved contour or curved shape such that the array of illumination parts 54 of each the braking condition images 60a, 60b, 60c and 60d can be easily displayed thereby.

Figure 17A:
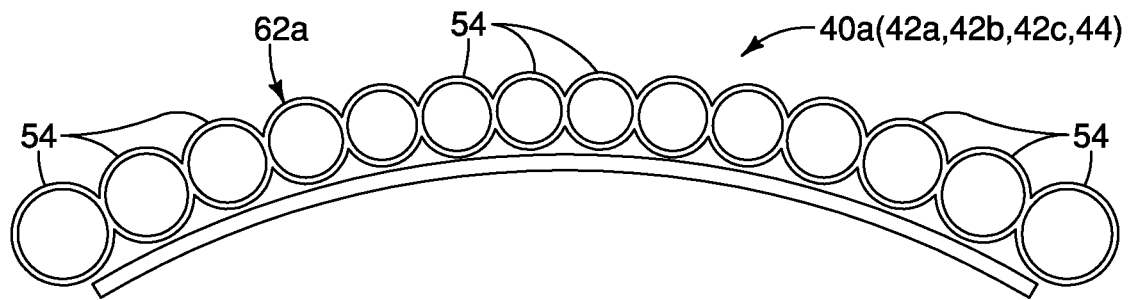
FIG. 17a is a schematic diagram showing a no braking image of a modified first set of braking condition images that, in response to evaluation of data, can be selected by the electronic controller for display in one or more of the above described braking condition display areas in accordance with the first embodiment.

A description of a modified version of the set of braking condition images shown in FIGS. 16a-16d is now provided with reference to FIGS. 17a through 17d. FIG. 17a shows the array of illumination parts 54 arranged as shown in FIGS. 16a-16d. Specifically, the array of illumination parts 54 define a curved shape. In FIG. 17a, the illumination parts 54 are not illuminated defining a no braking image 62a that corresponds to step S4 in FIG. 4 where the electronic controller 26 has determined that the lead vehicle 50 is not currently decelerating and therefore no braking is detected.

Figure 17B:
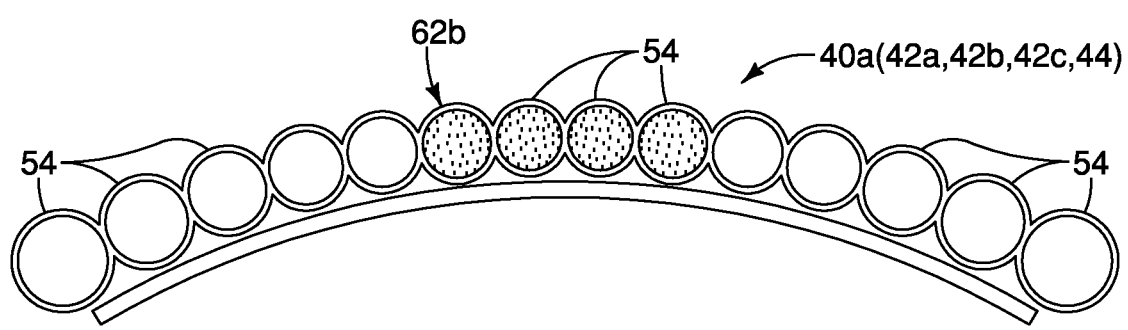
FIG. 17b is a schematic diagram showing a light braking image of the modified first set of braking condition images that, in response to evaluation of data, can be selected by the electronic controller for display in one or more of the above described braking condition display areas in accordance with the first embodiment.
Figure 17C:
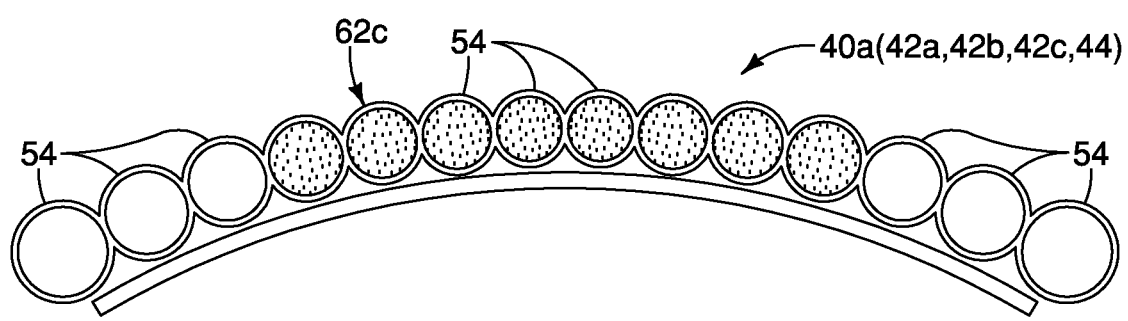
FIG. 17c is a schematic diagram showing a medium braking image of the modified first set of braking condition images that, in response to evaluation of data, can be selected by the electronic controller for display in one or more of the above described braking condition display areas in accordance with the first embodiment.

In FIG. 17b, four of the illumination parts 54 at the center of the array of illumination parts 54 are illuminated defining a light braking image 62b that corresponds to step S6 in FIG. 4 where the electronic controller 26 has determined that the lead vehicle 50 is currently gradually decelerating corresponding to a light braking condition. In FIG. 17c, eight or nine of the illumination parts 54 all at or adjacent to centered ones of the illumination parts 54 of the array of illumination parts 54 are illuminated defining a medium braking image 62c that corresponds to step S8 in FIG. 4. Put another way, the left and right end ones of the illumination parts 54 are not lite in the medium braking image 62c.

Figure 17D:
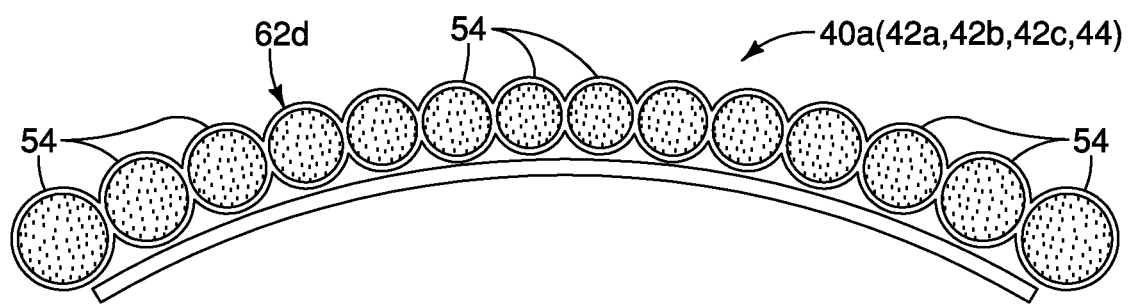
FIG. 17d is a schematic diagram showing a hard braking image of the modified first set of braking condition images that, in response to evaluation of data, can be selected by the electronic controller for display in one or more of the above described braking condition display areas in accordance with the first embodiment.

In FIG. 17d, all of the illumination parts 54 of the array of illumination parts 54 are illuminated defining a hard braking image 62d that corresponds to step S10 in FIG. 4 where the electronic controller 26 has determined that the lead vehicle 50 is currently rapidly decelerating corresponding to a hard braking condition.

The no braking image 62a, the light braking image 62b, the medium braking image 62c and the hard braking image 62d can be displayed in any of the braking condition display areas 40a, 42a, 42b, 42c and 44 as controlled by the electronic controller 26. Specifically, each of the braking condition display areas 40a, 42a, 42b, 42c and 44 has a curved contour or curved shape such that the array of illumination parts 54 of each the braking condition images 62a, 62b, 62c and 62d can be easily displayed thereby.

Second Embodiment

Referring now to FIGS. 18a-18d and 19a-19d, a plurality of braking condition images in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, a second set of braking condition images are described. The second set of braking condition images include an array of illumination parts 54 arranged linearly with respect to one another defining a horizontally oriented line of illumination parts 54.

Figure 18A:
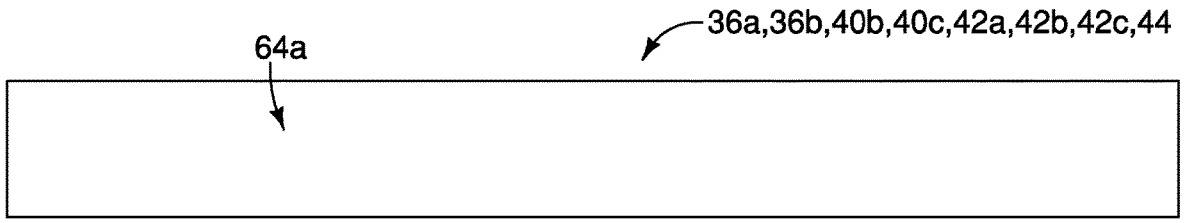
FIG. 18a is a schematic diagram showing a no braking image of a second set of braking condition images that, in response to evaluation of data, can be selected by the electronic controller for display in one or more of the above described braking condition display areas in accordance with a second embodiment.
Figure 18B:
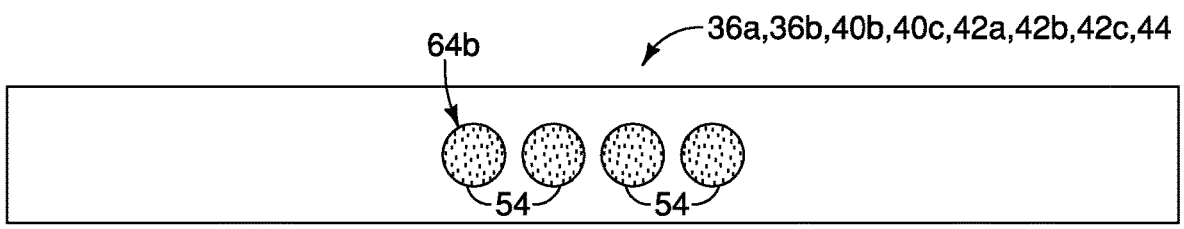
FIG. 18b is a schematic diagram showing a light braking image of the second set of braking condition images that, in response to evaluation of data, can be selected by the electronic controller for display in one or more of the above described braking condition display areas in accordance with the second embodiment.

FIG. 18a is blank because the array of illumination parts 54 are not illuminated and therefore are not visible defining a no braking image 64a that corresponds to step S4 in FIG. 4 where the electronic controller 26 has determined that the lead vehicle 50 is not currently decelerating and therefore no braking is detected. In FIG. 18b, four centered ones of the illumination parts 54 are illuminated defining a light braking image 64b that corresponds to step S6 in FIG. 4 where the electronic controller 26 has determined that the lead vehicle 50 is currently gradually decelerating corresponding to a light braking condition.

Figure 18C:
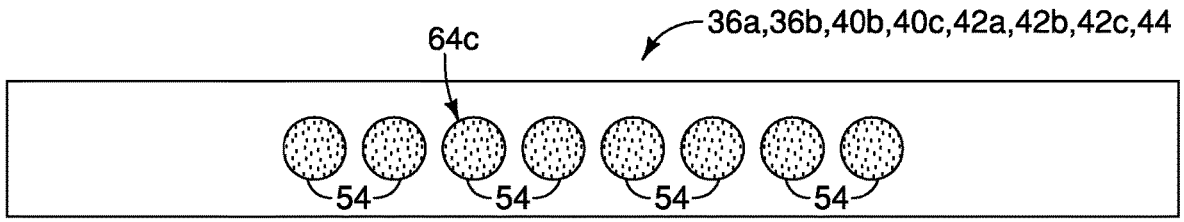
FIG. 18c is a schematic diagram showing a medium braking image of the second set of braking condition images that, in response to evaluation of data, can be selected by the electronic controller for display in one or more of the above described braking condition display areas in accordance with the second embodiment.
Figure 18D:
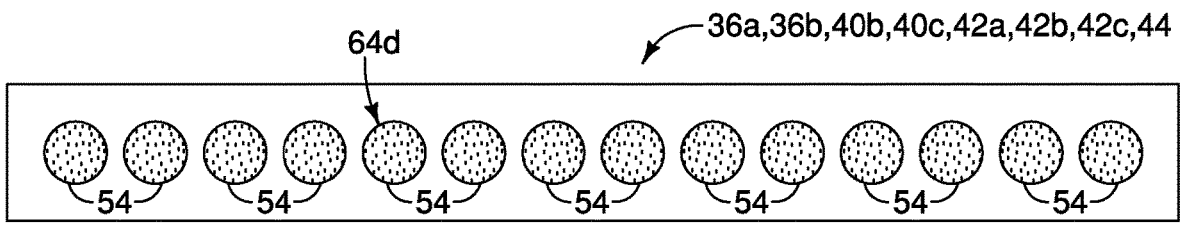
FIG. 18d is a schematic diagram showing a hard braking image of the second set of braking condition images that, in response to evaluation of data, can be selected by the electronic controller for display in one or more of the above described braking condition display areas in accordance with the second embodiment.

In FIG. 18c, eight or nine centered ones of the illumination parts 54 are illuminated defining a medium braking image 64c that corresponds to step S8 in FIG. 4. In step S8 the electronic controller 26 has determined that the lead vehicle 50 is currently decelerating at a rate corresponding to a medium braking condition. In FIG. 18d, all of the illumination parts 54 of the array of illumination parts 54 are illuminated defining a hard braking image 64d that corresponds to step S10 in FIG. 4 where the electronic controller 26 has determined that the lead vehicle 50 is currently rapidly decelerating corresponding to a hard braking condition.

The no braking image 66a, the light braking image 66b, the medium braking image 66c and the hard braking image 66d can be displayed in any of the braking condition display areas 36a, 36b, 40b, 40c, 42a, 42b, 42c and 44 as controlled by the electronic controller 26.

Figure 19A:
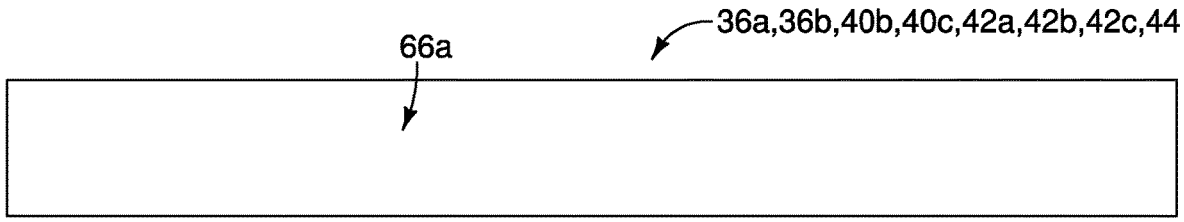
FIG. 19a is a schematic diagram showing a no braking image of a modified second set of braking condition images that, in response to evaluation of data, can be selected by the electronic controller for display in one or more of the above described braking condition display areas in accordance with the second embodiment.

A description of a modified version of the second set of braking condition images shown in FIGS. 18a-18d is now provided with reference to FIGS. 19a through 19d. FIG. 19a is blank because the array of illumination parts 54 are not illuminated defining a no braking image 66a that corresponds to step S4 in FIG. 4 where the electronic controller 26 has determined that the lead vehicle 50 is not currently decelerating and therefore no braking is detected.

Figure 19B:
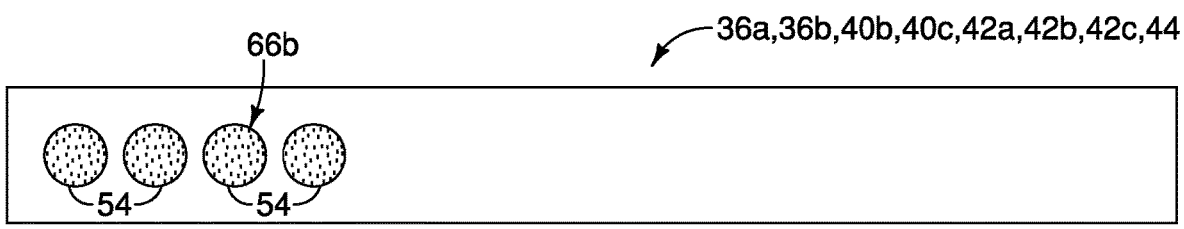
FIG. 19b is a schematic diagram showing a light braking image of the modified second set of braking condition images that, in response to evaluation of data, can be selected by the electronic controller for display in one or more of the above described braking condition display areas in accordance with the second embodiment.
Figure 19C:
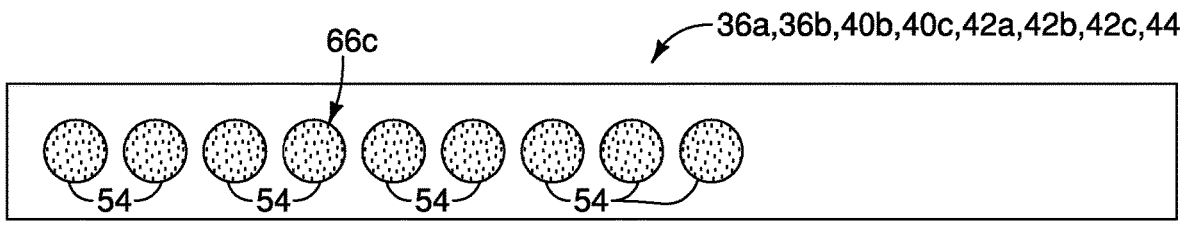
FIG. 19c is a schematic diagram showing a medium braking image of the modified second set of braking condition images that, in response to evaluation of data, can be selected by the electronic controller for display in one or more of the above described braking condition display areas in accordance with the second embodiment.

In FIG. 19b, four of the illumination parts 54 at the left end of the array of illumination parts 54 are illuminated defining a light braking image 66b that corresponds to step S6 in FIG. 4 where the electronic controller 26 has determined that the lead vehicle 50 is currently gradually decelerating corresponding to a light braking condition. In FIG. 19c, eight or nine of the illumination parts 54 beginning at the left side an going past a center of the array of illumination parts 54 are illuminated defining a medium braking image 66c that corresponds to step S8 in FIG. 4.

Figure 19D:
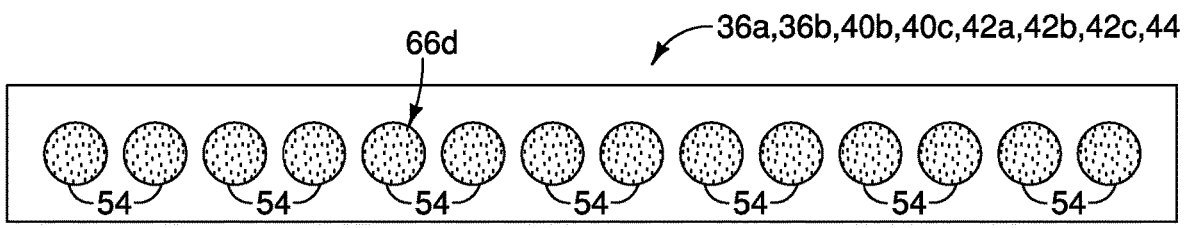
FIG. 19d is a schematic diagram showing a hard braking image of the modified second set of braking condition images that, in response to evaluation of data, can be selected by the electronic controller for display in one or more of the above described braking condition display areas in accordance with the second embodiment.

In FIG. 19d, all of the illumination parts 54 of the array of illumination parts 54 are illuminated defining a hard braking image 66d that corresponds to step S10 in FIG. 4 where the electronic controller 26 has determined that the lead vehicle 50 is currently rapidly decelerating corresponding to a hard braking condition.

The no braking image 66a, the light braking image 66b, the medium braking image 66c and the hard braking image 66d can be displayed in any of the braking condition display areas 36a, 36b, 40b, 40c, 42a, 42b, 42c and 44 as controlled by the electronic controller 26.

Third Embodiment

Referring now to FIGS. 20a-20d and 21a-21d, a plurality of braking condition images in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment, a third set of braking condition images are described. The third set of braking condition images include illumination parts 56 arranged linearly with respect to one another defining a horizontally oriented line of illumination parts 56. The arrangement of the illumination parts 56 is such that regardless of how many adjacent illumination parts 56 are lit, the illumination parts 56 appear to be single illuminated line.

Figure 20A:
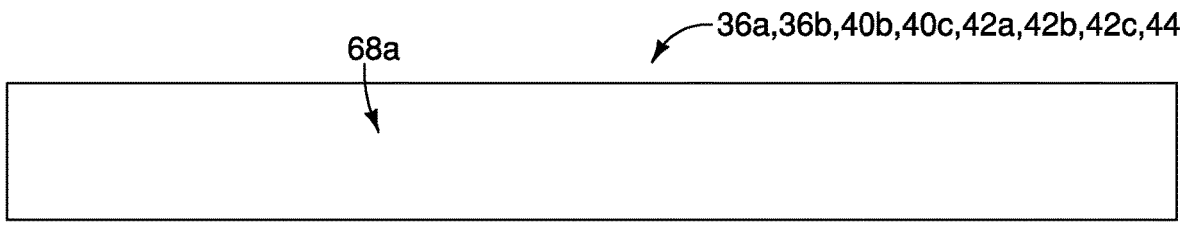
FIG. 20a is a schematic diagram showing a no braking image of a third set of braking condition images that, in response to evaluation of data, can be selected by the electronic controller for display in one or more of the above described braking condition display areas in accordance with a third embodiment.
Figure 20B:
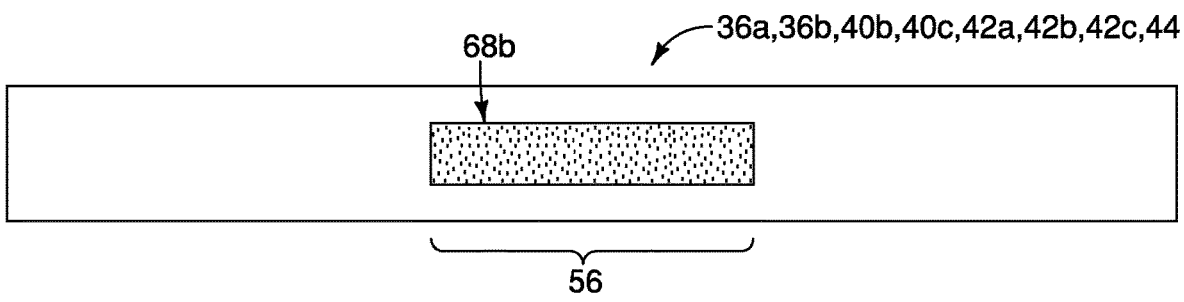
FIG. 20b is a schematic diagram showing a light braking image of the third set of braking condition images that, in response to evaluation of data, can be selected by the electronic controller for display in one or more of the above described braking condition display areas in accordance with the third embodiment.

FIG. 20a is blank because the array of illumination parts 56 are not illuminated and therefore are not visible defining a no braking image 68a that corresponds to step S4 in FIG. 4 where the electronic controller 26 has determined that the lead vehicle 50 is not currently decelerating and therefore no braking is detected. In FIG. 20b, a centered one of the illumination parts 56 is illuminated defining a light braking image 68b that corresponds to step S6 in FIG. 4 where the electronic controller 26 has determined that the lead vehicle 50 is currently gradually decelerating corresponding to a light braking condition.

Figure 20C:
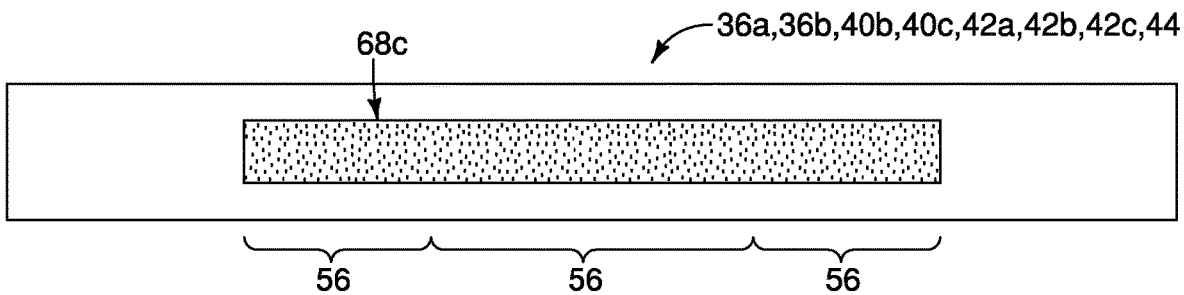
FIG. 20c is a schematic diagram showing a medium braking image of the third set of braking condition images that, in response to evaluation of data, can be selected by the electronic controller for display in one or more of the above described braking condition display areas in accordance with the third embodiment.
Figure 20D:
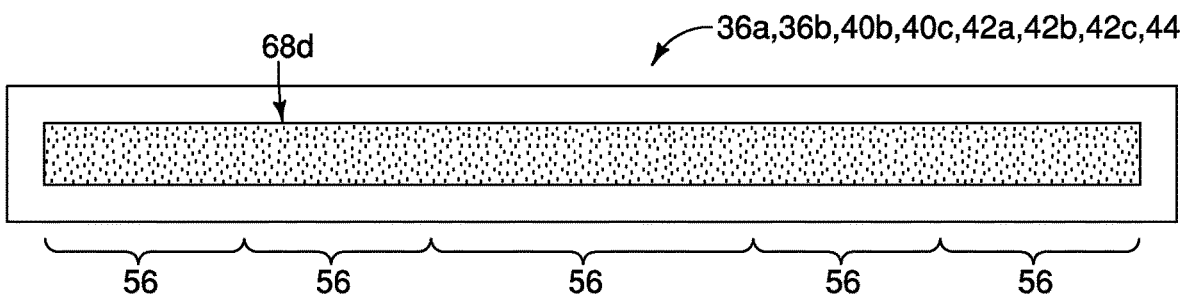
FIG. 20d is a schematic diagram showing a hard braking image of the third set of braking condition images that, in response to evaluation of data, can be selected by the electronic controller for display in one or more of the above described braking condition display areas in accordance with the third embodiment.

In FIG. 20c, the centered one and adjacent off centered ones of the illumination parts 56 are illuminated defining a medium braking image 68c that corresponds to step S8 in FIG. 4. In step S8 the electronic controller 26 has determined that the lead vehicle 50 is currently decelerating at a rate corresponding to a medium braking condition. In FIG. 20d, all of the illumination parts 56 of the array of illumination parts 54 are illuminated defining a hard braking image 68d that corresponds to step S10 in FIG. 4 where the electronic controller 26 has determined that the lead vehicle 50 is currently rapidly decelerating corresponding to a hard braking condition.

The no braking image 68a, the light braking image 68b, the medium braking image 68c and the hard braking image 68d can be displayed in any of the braking condition display areas 36a, 36b, 40b, 40c, 42a, 42b, 42c and 44 as controlled by the electronic controller 26.

Figure 21A:
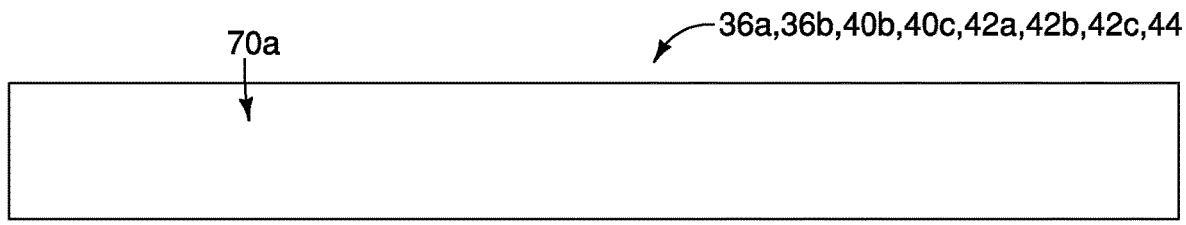
FIG. 21a is a schematic diagram showing a no braking image of a modified third set of braking condition images that, in response to evaluation of data, can be selected by the electronic controller for display in one or more of the above described braking condition display areas in accordance with the third embodiment.

A description of a modified version of the third set of braking condition images shown in FIGS. 20a-20d is now provided with reference to FIGS. 21a through 21d. FIG. 21a is blank because the array of illumination parts 56 are not illuminated defining a no braking image 70a that corresponds to step S4 in FIG. 4 where the electronic controller 26 has determined that the lead vehicle 50 is not currently decelerating and therefore no braking is detected.

Figure 21B:
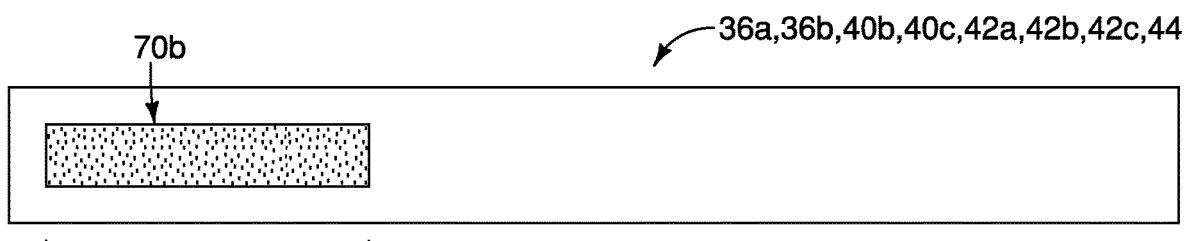
FIG. 21b is a schematic diagram showing a light braking image of the modified third set of braking condition images that, in response to evaluation of data, can be selected by the electronic controller for display in one or more of the above described braking condition display areas in accordance with the third embodiment.
Figure 21C:
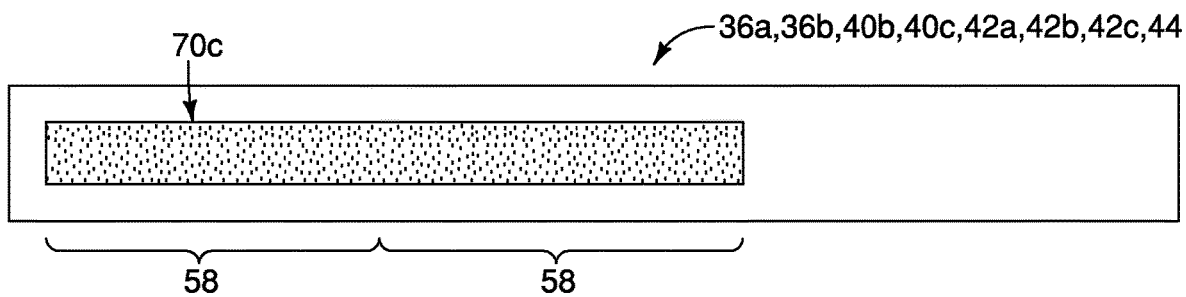
FIG. 21c is a schematic diagram showing a medium braking image of the modified third set of braking condition images that, in response to evaluation of data, can be selected by the electronic controller for display in one or more of the above described braking condition display areas in accordance with the third embodiment.

In FIG. 21b, one of the illumination parts 58 at the left end of the array of illumination parts 54 is illuminated defining a light braking image 70b that corresponds to step S6 in FIG. 4 where the electronic controller 26 has determined that the lead vehicle 50 is currently gradually decelerating corresponding to a light braking condition. In FIG. 21c, two of the illumination parts 58, a left side illumination part 58 and a central illumination part 58 are illuminated defining a medium braking image 70c that corresponds to step S8 in FIG. 4.

Figure 21D:
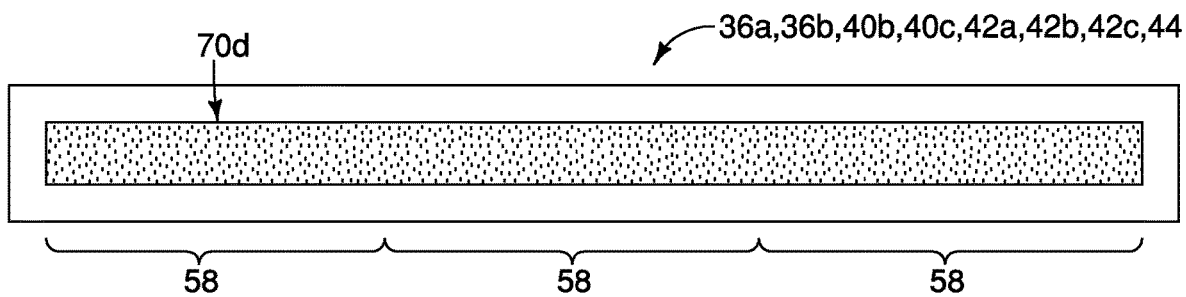
FIG. 21d is a schematic diagram showing a hard braking image of the modified third set of braking condition images that, in response to evaluation of data, can be selected by the electronic controller for display in one or more of the above described braking condition display areas in accordance with the third embodiment.

In FIG. 21d, all three of the illumination parts 58 are illuminated defining a hard braking image 70d that corresponds to step S10 in FIG. 4 where the electronic controller 26 has determined that the lead vehicle 50 is currently rapidly decelerating corresponding to a hard braking condition.

The no braking image 70a, the light braking image 70b, the medium braking image 70c and the hard braking image 70d can be displayed in any of the braking condition display areas 36a, 36b, 40b, 40c, 42a, 42b, 42c and 44 as controlled by the electronic controller 26.

Fourth Embodiment

Referring now to FIGS. 22a-22d, 23a-23d and 24a-24d, a plurality of braking condition images in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

In the fourth embodiment, a fourth set of braking condition images are described. Each of the braking condition images of the fourth embodiment have a rectangular frame F. A faux image of the lead vehicle 50' is shown at an upper central location within the frame F. Two diagonal lines $L_1$ (shown in one point perspective) extend downward from the faux image of the lead vehicle 50' representing lane divide lines. Optionally, a representation of the steering wheel of the host vehicle 10 and hands of the vehicle operator can be shown between the two diagonal lines $L_1$.

Figure 22A:
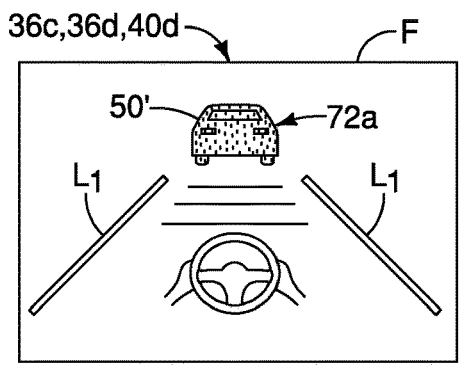
FIG. 22a is a schematic diagram showing a no braking image of a fourth set of braking condition images that, in response to evaluation of data, can be selected by the electronic controller for display in one or more of the above described braking condition display areas in accordance with a fourth embodiment.
Figure 22B:
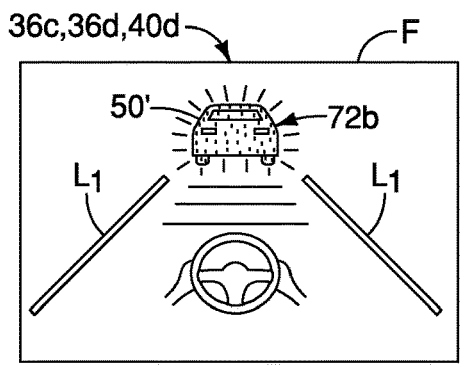
FIG. 22b is a schematic diagram showing a light braking image of the fourth set of braking condition images that, in response to evaluation of data, can be selected by the electronic controller for display in one or more of the above described braking condition display areas in accordance with the fourth embodiment.

FIG. 22a is shows the faux image of the lead vehicle 50' in a non-illuminated state. Only the outline of the faux image of the lead vehicle 50' is visible defining a no braking image 72a that corresponds to step S4 in FIG. 4 where the electronic controller 26 has determined that the lead vehicle 50 is not currently decelerating and therefore no braking is detected. In FIG. 22b, the line outline of the faux image of the lead vehicle 50' and/or the interior area within the faux image of the lead vehicle 50' is slightly illuminated defining a light braking image 72b that corresponds to step S6 in FIG. 4 where the electronic controller 26 has determined that the lead vehicle 50 is currently gradually decelerating corresponding to a light braking condition. More specifically, the outline of the faux image of the lead vehicle 50' can be illuminated at a low intensity of light defining the light braking image 72b. Alternatively, the interior of the faux image of the lead vehicle 50' can be illuminated at a low intensity of light or illuminated with a first color, such a light shade of red, or yellow. Still further, the outline of the faux image of the lead vehicle 50' can be illuminated at a low intensity of light and the interior of the faux image of the lead vehicle 50' can be illuminated at a low intensity of light or illuminated with a first color, such a light shade of red, or yellow thereby defining the light braking image 72b.

Figure 22C:
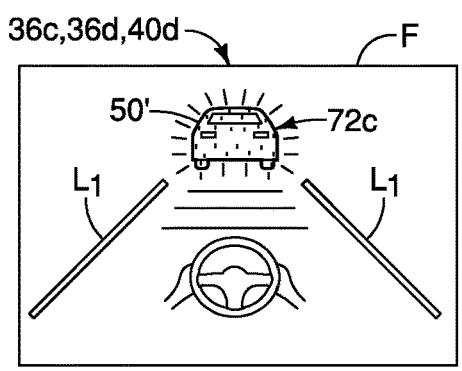
FIG. 22c is a schematic diagram showing a medium braking image of the fourth set of braking condition images that, in response to evaluation of data, can be selected by the electronic controller for display in one or more of the above described braking condition display areas in accordance with the fourth embodiment.

In FIG. 22c, the line outline of the faux image of the lead vehicle 50' and/or the interior area within the faux image of the lead vehicle 50' is illuminated at a level greater than the light braking image 72b thereby defining a medium braking image 72c that corresponds to step S8 in FIG. 4 where the electronic controller 26 has determined that the lead vehicle 50 is currently decelerating corresponding to a medium braking condition. More specifically, the outline of the faux image of the lead vehicle 50' can be illuminated at an intensity of light or color that is brighter and more noticeable than the light braking image 72b. Alternatively, the interior of the faux image of the lead vehicle 50' can be illuminated at a corresponding intensity of light or illuminated with a second color, such a brighter shade of red, or yellow. Still further, the outline of the faux image of the lead vehicle 50' can be illuminated at a medium intensity of light and the interior of the faux image of the lead vehicle 50' can be illuminated at the corresponding intensity of light or illuminated with a second color, such a brighter shade of red, or yellow thereby defining the medium braking image 72c.

Figure 22D:
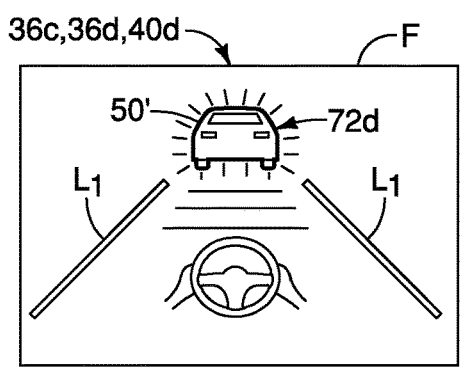
FIG. 22d is a schematic diagram showing a hard braking image of the fourth set of braking condition images that, in response to evaluation of data, can be selected by the electronic controller for display in one or more of the above described braking condition display areas in accordance with the fourth embodiment.

In FIG. 22d, the line outline of the faux image of the lead vehicle 50' and/or the interior area within the faux image of the lead vehicle 50' is illuminated at a level greater than the medium braking image 72c thereby defining a hard braking image 72d that corresponds to step S10 in FIG. 4 where the electronic controller 26 has determined that the lead vehicle 50 is currently rapidly decelerating corresponding to a hard braking condition. More specifically, the outline of the faux image of the lead vehicle 50' can be illuminated at an intensity of light or color that is brighter and more noticeable than the medium braking image 72c. Alternatively, the interior of the faux image of the lead vehicle 50' can be illuminated at a corresponding intensity of light or illuminated with a third color, such a brighter shade of red, or yellow. Still further, the outline of the faux image of the lead vehicle 50' can be illuminated at a high intensity of light and the interior of the faux image of the lead vehicle 50' can be illuminated at the corresponding intensity of light or illuminated with a third color, such a brighter shade of red, or yellow thereby defining the hard braking image 72d.

The no braking image 72a, the light braking image 72b, the medium braking image 72c and the hard braking image 72d can be displayed in any of the braking condition display areas 36c, 36d and 40d as controlled by the electronic controller 26.

FIGS. 23a-23d show a first modification to the fourth set of braking condition images described above.

Figure 23A:
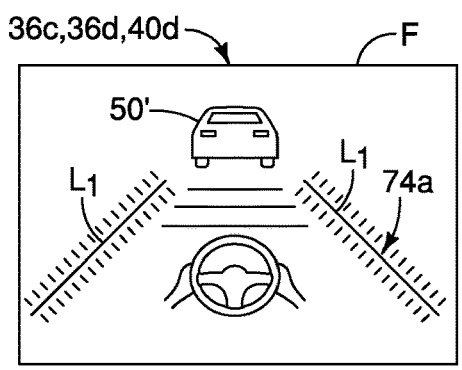
FIG. 23a is a schematic diagram showing a no braking image of a modified fourth set of braking condition images that, in response to evaluation of data, can be selected by the electronic controller for display in one or more of the above described braking condition display areas in accordance with the fourth embodiment.
Figure 23B:
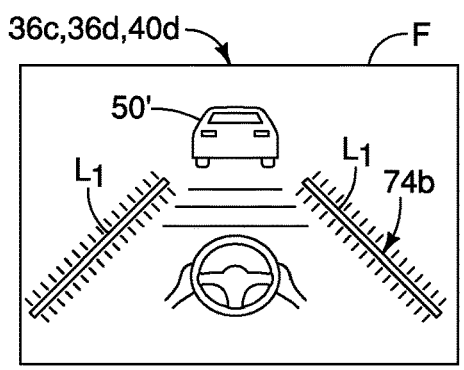
FIG. 23b is a schematic diagram showing a light braking image of the modified fourth set of braking condition images that, in response to evaluation of data, can be selected by the electronic controller for display in one or more of the above described braking condition display areas in accordance with the fourth embodiment.

FIG. 23a is shows the diagonal lines $L_1$ in a non-illuminated state. Only the outline of the diagonal lines $L_1$ are visible defining a no braking image 74a that corresponds to step S4 in FIG. 4 where the electronic controller 26 has determined that the lead vehicle 50 is not currently decelerating and therefore no braking is detected. In FIG. 23b, the diagonal lines $L_1$ slightly illuminated defining a light braking image 74b that corresponds to step S6 in FIG. 4 where the electronic controller 26 has determined that the lead vehicle 50 is currently gradually decelerating corresponding to a light braking condition. More specifically, the diagonal lines $L_1$ can be illuminated at the low intensity of light defining the light braking image 74b or can be illuminated with a first color, such as a soft red or yellow color.

Figure 23C:
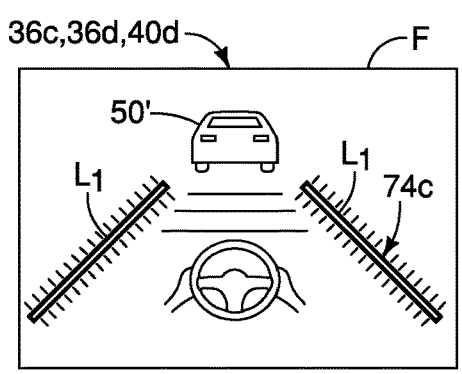
FIG. 23c is a schematic diagram showing a medium braking image of the modified fourth set of braking condition images that, in response to evaluation of data, can be selected by the electronic controller for display in one or more of the above described braking condition display areas in accordance with the fourth embodiment.

In FIG. 23c, the diagonal lines $L_1$ are illuminated at a level greater than the light braking image 74b thereby defining a medium braking image 74c that corresponds to step S8 in FIG. 4 where the electronic controller 26 has determined that the lead vehicle 50 is currently decelerating at a rate corresponding to a medium braking condition. More specifically, the diagonal lines $L_1$ can be illuminated at an intensity of light or color that is brighter and more noticeable than the light braking image 74b thereby defining the medium braking image 74c.

Figure 23D:
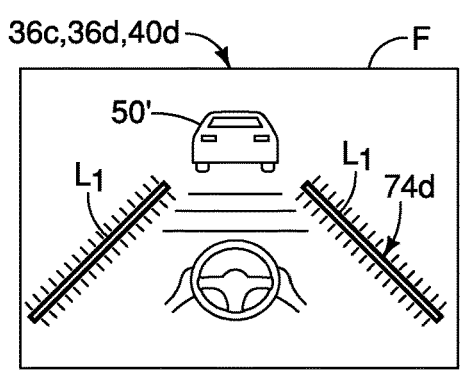
FIG. 23d is a schematic diagram showing a hard braking image of the modified fourth set of braking condition images that, in response to evaluation of data, can be selected by the electronic controller for display in one or more of the above described braking condition display areas in accordance with the fourth embodiment.

In FIG. 23d, the diagonal lines $L_1$ are illuminated at a level greater than the medium braking image 74c thereby defining a hard braking image 74d that corresponds to step S10 in FIG. 4 where the electronic controller 26 has determined that the lead vehicle 50 is currently rapidly decelerating corresponding to a hard braking condition. More specifically, the diagonal lines $L_1$ can be illuminated at an intensity of light or color that is brighter and more noticeable than the medium braking image 74c, such as a bright shade of red, or yellow thereby defining the hard braking image 74d.

The no braking image 74a, the light braking image 74b, the medium braking image 74c and the hard braking image 74d can be displayed in any of the braking condition display areas 36c, 36d and 40d as controlled by the electronic controller 26.

FIGS. 24a-24d show a second modification to the fourth set of braking condition images described above. In FIGS. 24a-24d, the rectangular frame F surrounding each of the braking condition images is manipulated defining a no braking image 76a, a light braking image 76b, a medium braking image 76c and a hard braking image 76d, as described below.

Figure 24A:
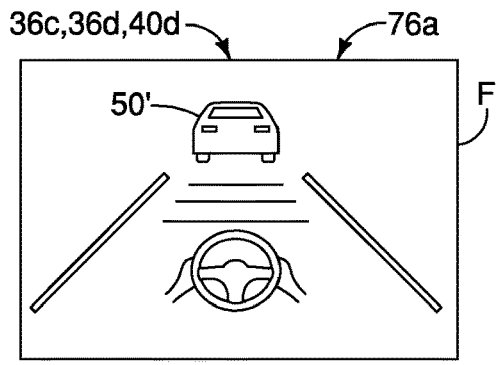
FIG. 24a is a schematic diagram showing a no braking image of a further modified fourth set of braking condition images that, in response to evaluation of data, can be selected by the electronic controller for display in one or more of the above described braking condition display areas in accordance with the fourth embodiment.
Figure 24B:
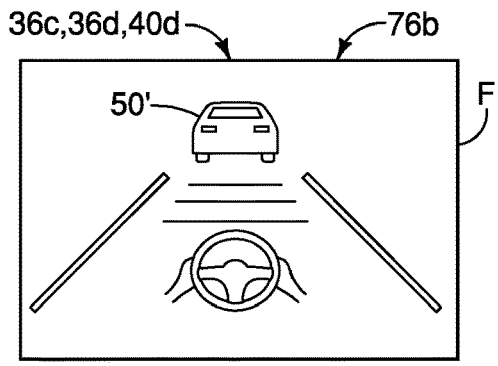
FIG. 24b is a schematic diagram showing a light braking image of the further modified fourth set of braking condition images that, in response to evaluation of data, can be selected by the electronic controller for display in one or more of the above described braking condition display areas in accordance with the fourth embodiment.

FIG. 24a is shows the outline of the rectangular frame F as an outline only with no significant illumination other than being visible. Hence in FIG. 24a, the rectangular frame F defines a no braking image 76a that corresponds to step S4 in FIG. 4 where the electronic controller 26 has determined that the lead vehicle 50 is not currently decelerating and therefore no braking is detected. In FIG. 24b, the rectangular frame F is slightly illuminated with a level of illumination greater than the no braking image 76a thereby defining a light braking image 74b that corresponds to step S6 in FIG. 4 where the electronic controller 26 has determined that the lead vehicle 50 is currently gradually decelerating corresponding to a light braking condition. More specifically, the rectangular frame F can be illuminated at the low intensity of light defining the light braking image 76b or can be illuminated with a first color, such as a soft red or yellow color.

Figure 24C:
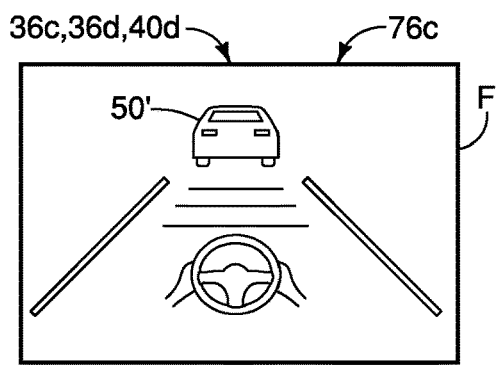
FIG. 24c is a schematic diagram showing a medium braking image of the further modified fourth set of braking condition images that, in response to evaluation of data, can be selected by the electronic controller for display in one or more of the above described braking condition display areas in accordance with the fourth embodiment.

In FIG. 24c, the rectangular frame F is illuminated at a level greater than the light braking image 76b thereby defining a medium braking image 76c that corresponds to step S8 in FIG. 4 where the electronic controller 26 has determined that the lead vehicle 50 is currently decelerating at a rate corresponding to a medium braking condition. More specifically, the rectangular frame F can be illuminated at an intensity of light or color that is brighter and more noticeable than the light braking image 76b thereby defining the medium braking image 76c.

Figure 24D:
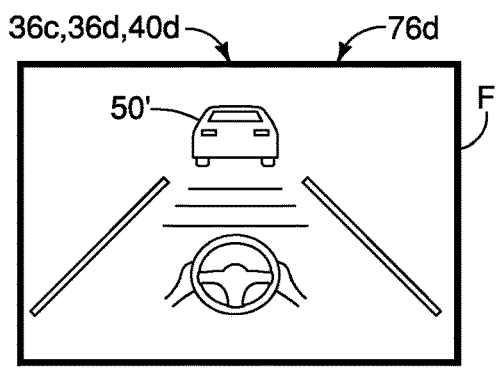
FIG. 24d is a schematic diagram showing a hard braking image of the further modified fourth set of braking condition images that, in response to evaluation of data, can be selected by the electronic controller for display in one or more of the above described braking condition display areas in accordance with the fourth embodiment.

In FIG. 24d, the rectangular frame F is illuminated at a level greater than the medium braking image 76c thereby defining a hard braking image 76d that corresponds to step S10 in FIG. 4 where the electronic controller 26 has determined that the lead vehicle 50 is currently rapidly decelerating corresponding to a hard braking condition. More specifically, the rectangular frame F can be illuminated at an intensity of light or color that is brighter and more noticeable than the medium braking image 76c, such as a bright shade of red, or yellow thereby defining the hard braking image 76d.

The no braking image 76a, the light braking image 76b, the medium braking image 76c and the hard braking image 76d can be displayed in any of the braking condition display areas 36c, 36d and 40d as controlled by the electronic controller 26.

Fifth Embodiment

Referring now to FIGS. 25a-25d, 26a-26d and 27a-27d, a plurality of braking condition images in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

In the fifth embodiment, a fifth set of braking condition images are described. Each of the braking condition images of the fifth embodiment are defined by illuminated linear lines manipulated to define each of the plurality of braking condition images described below.

Figure 25A:
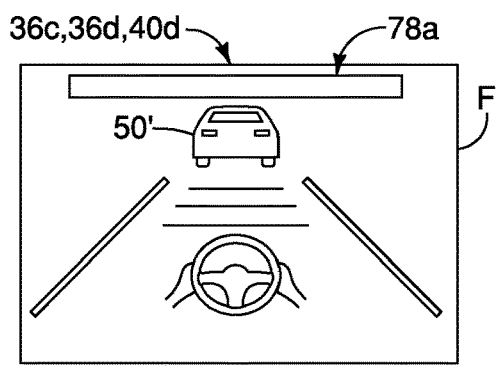
FIG. 25a is a schematic diagram showing a no braking image of a fifth set of braking condition images that, in response to evaluation of data, can be selected by the electronic controller for display in one or more of the above described braking condition display areas in accordance with a fifth embodiment.
Figure 25B:
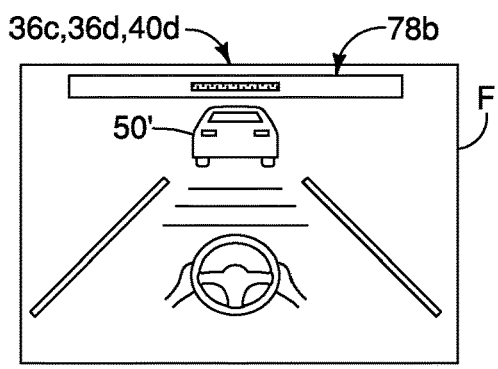
FIG. 25b is a schematic diagram showing a light braking image of the fifth set of braking condition images that, in response to evaluation of data, can be selected by the electronic controller for display in one or more of the above described braking condition display areas in accordance with the fifth embodiment.

FIG. 25a shows a blank area within a rectangular border F and above the faux image of the lead vehicle 50' that defines a no braking image 78a corresponding to step S4 in FIG. 4 where the electronic controller 26 has determined that the lead vehicle 50 is not currently decelerating and therefore no braking is detected. In FIG. 25b, a rectangular shaped are replaces the blank area and includes a centered illuminated area having a first length defining a light braking image 78b that corresponds to step S6 in FIG. 4 where the electronic controller 26 has determined that the lead vehicle 50 is currently gradually decelerating corresponding to a light braking condition. The light braking image 78b can be illuminated at a low intensity of light or illuminated with a first color, such a light shade of red, or yellow.

Figure 25C:
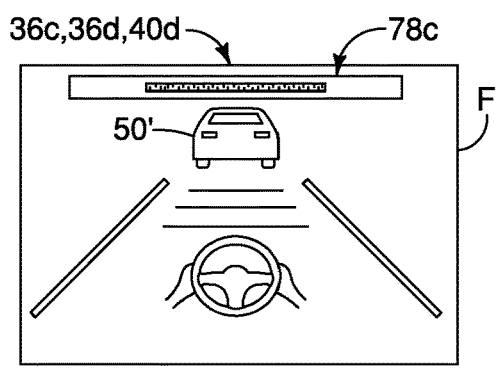
FIG. 25c is a schematic diagram showing a medium braking image of the fifth set of braking condition images that, in response to evaluation of data, can be selected by the electronic controller for display in one or more of the above described braking condition display areas in accordance with the fifth embodiment.

In FIG. 25c, the line within the rectangle has a second length greater than the first length that is illuminated at a level greater than the light braking image 78b thereby defining a medium braking image 78c that corresponds to step S8 in FIG. 4 where the electronic controller 26 has determined that the lead vehicle 50 is currently decelerating corresponding to a medium braking condition. The illuminated line of the medium braking image 78c can be illuminated at an intensity of light or color that is brighter and more noticeable than the light braking image 78b.

Figure 25D:
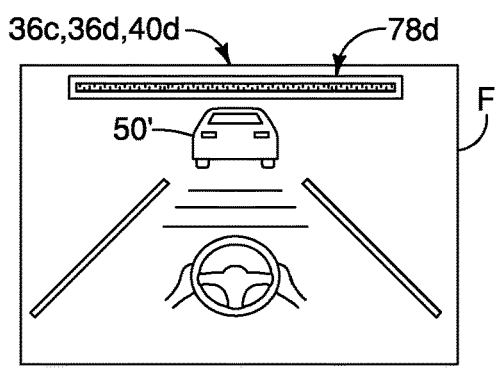
FIG. 25d is a schematic diagram showing a hard braking image of the fifth set of braking condition images that, in response to evaluation of data, can be selected by the electronic controller for display in one or more of the above described braking condition display areas in accordance with the fifth embodiment.

In FIG. 25d, the line within the rectangle has a third length greater than the second length and is illuminated at a level greater than the medium braking image 78c thereby defining a hard braking image 78d that corresponds to step S10 in FIG. 4 where the electronic controller 26 has determined that the lead vehicle 50 is currently rapidly decelerating corresponding to a hard braking condition. More specifically, the illuminated line of the hard braking image 78d can be illuminated at an intensity of light or color that is brighter and more noticeable than the medium braking image 78c.

The no braking image 78a, the light braking image 78b, the medium braking image 78c and the hard braking image 78d can be displayed in any of the braking condition display areas 36c, 36d and 40d as controlled by the electronic controller 26.

FIGS. 26a-26d show a first modification to the fifth set of braking condition images described above.

Figure 26A:
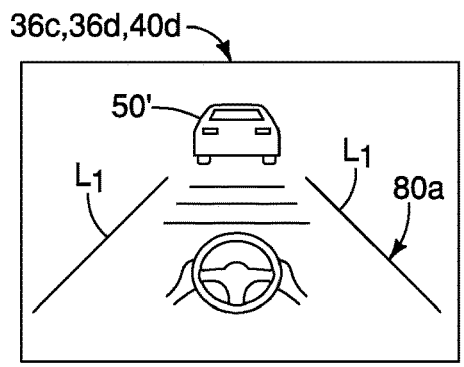
FIG. 26a is a schematic diagram showing a no braking image of a modified fifth set of braking condition images that, in response to evaluation of data, can be selected by the electronic controller for display in one or more of the above described braking condition display areas in accordance with the fifth embodiment.
Figure 26B:
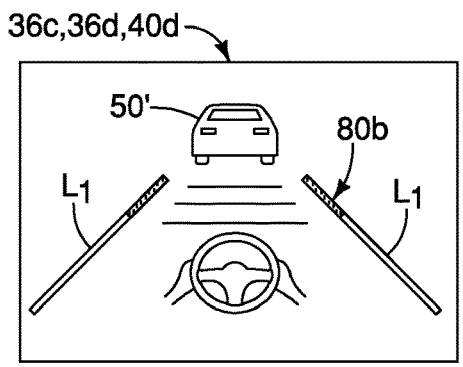
FIG. 26b is a schematic diagram showing a light braking image of the modified fifth set of braking condition images that, in response to evaluation of data, can be selected by the electronic controller for display in one or more of the above described braking condition display areas in accordance with the fifth embodiment.

FIG. 26a is shows the diagonal lines $L_1$ in a non-illuminated state. Only the outline of the diagonal lines $L_1$ are visible defining a no braking image 80a that corresponds to step S4 in FIG. 4 where the electronic controller 26 has determined that the lead vehicle 50 is not currently decelerating and therefore no braking is detected. In FIG. 26b, upper end portions of the diagonal lines $L_1$ (approximately ⅓ of each of diagonal lines $L_1$) are slightly illuminated defining a light braking image 80b that corresponds to step S6 in FIG. 4 where the electronic controller 26 has determined that the lead vehicle 50 is currently gradually decelerating corresponding to a light braking condition. More specifically, the upper end portions of the diagonal lines $L_1$ can be illuminated at the low intensity of light defining the light braking image 74b or can be illuminated with a first color, such as a soft red or yellow color.

Figure 26C:
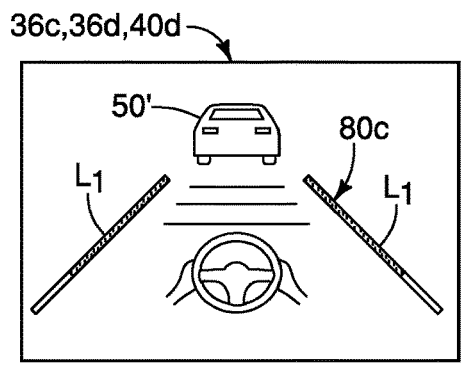
FIG. 26c is a schematic diagram showing a medium braking image of the modified fifth set of braking condition images that, in response to evaluation of data, can be selected by the electronic controller for display in one or more of the above described braking condition display areas in accordance with the fifth embodiment.

In FIG. 26c, more of the upper portion of the diagonal lines $L_1$ (approximately ⅔ of the length of each of the diagonal lines $L_1$) longer than in the light braking image 80b are illuminated thereby defining a medium braking image 80c that corresponds to step S8 in FIG. 4 where the electronic controller 26 has determined that the lead vehicle 50 is currently decelerating at a rate corresponding to a medium braking condition. Further, the illuminated portions of the diagonal lines $L_1$ of the medium braking image 80c can be illuminated at an intensity of light or color that is brighter and more noticeable than the light braking image 74b thereby defining the medium braking image 80c.

Figure 26D:
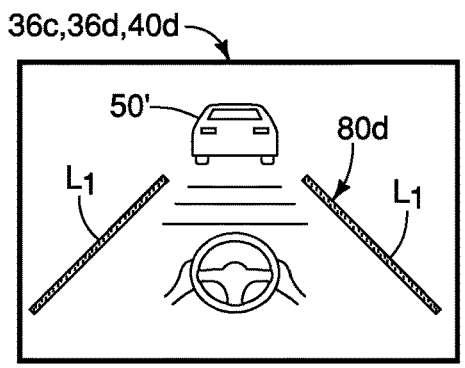
FIG. 26d is a schematic diagram showing a hard braking image of the modified fifth set of braking condition images that, in response to evaluation of data, can be selected by the electronic controller for display in one or more of the above described braking condition display areas in accordance with the fifth embodiment.

In FIG. 26d, the entire length of the diagonal lines $L_1$ are illuminated thereby defining a hard braking image 80d that corresponds to step S10 in FIG. 4 where the electronic controller 26 has determined that the lead vehicle 50 is currently rapidly decelerating corresponding to a hard braking condition. More specifically, the diagonal lines $L_1$ can be illuminated at an intensity of light or color that is brighter and more noticeable than the medium braking image 80c, such as a bright shade of red, or yellow thereby defining the hard braking image 80d.

The no braking image 80a, the light braking image 80b, the medium braking image 80c and the hard braking image 80d can be displayed in any of the braking condition display areas 36c, 36d and 40d as controlled by the electronic controller 26.

Figure 27A:
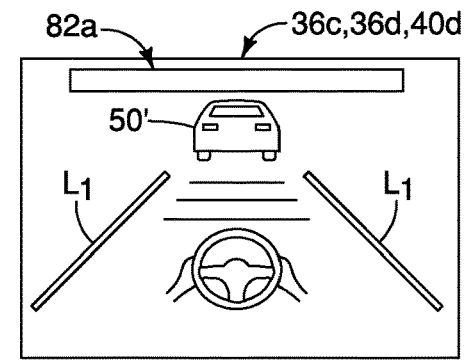
FIG. 27a is a schematic diagram showing a no braking image of a further modified fifth set of braking condition images that, in response to evaluation of data, can be selected by the electronic controller for display in one or more of the above described braking condition display areas in accordance with the fifth embodiment.

A description of another modified version of the fifth set of braking condition images shown in FIGS. 25a-25d is now provided with reference to FIGS. 27a through 27d. FIG. 27a has a blank rectangle similar to that shown in FIG. 25a defining a no braking image 82a that corresponds to step S4 in FIG. 4 where the electronic controller 26 has determined that the lead vehicle 50 is not currently decelerating and therefore no braking is detected.

Figure 27B:
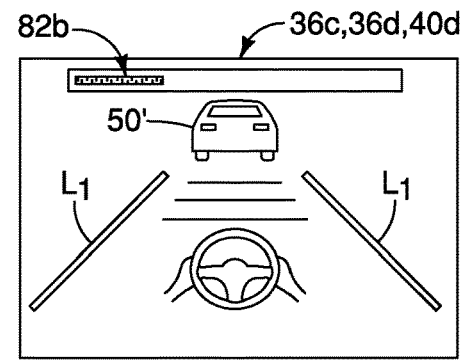
FIG. 27b is a schematic diagram showing a light braking image of the further modified fifth set of braking condition images that, in response to evaluation of data, can be selected by the electronic controller for display in one or more of the above described braking condition display areas in accordance with the fifth embodiment.
Figure 27C:
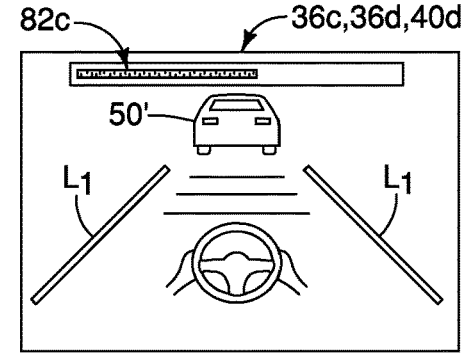
FIG. 27c is a schematic diagram showing a medium braking image of the further modified fifth set of braking condition images that, in response to evaluation of data, can be selected by the electronic controller for display in one or more of the above described braking condition display areas in accordance with the fifth embodiment.
Figure 27D:
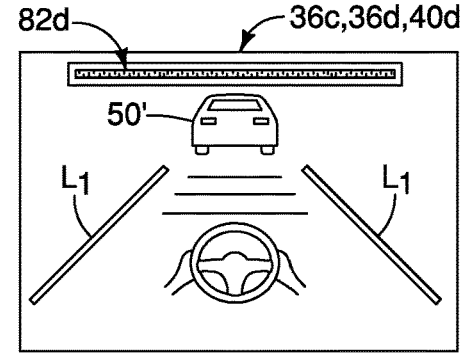
FIG. 27d is a schematic diagram showing a hard braking image of the further modified fifth set of braking condition images that, in response to evaluation of data, can be selected by the electronic controller for display in one or more of the above described braking condition display areas in accordance with the fifth embodiment.

In FIG. 27b, at a left end of the rectangular box, a line having a first overall length is illuminated defining a light braking image 82b that corresponds to step S6 in FIG. 4 where the electronic controller 26 has determined that the lead vehicle 50 is currently gradually decelerating corresponding to a light braking condition. In FIG. 27c, beginning at a left end of the rectangular box and extending through a central portion thereof, a line having a second overall length greater than the first overall length depicted in FIG. 27b is illuminated defining a medium braking image 82c that corresponds to step S8 in FIG. 4. In FIG. 27d, a line extends the entire length of the rectangle defining a hard braking image 82d that corresponds to step S10 in FIG. 4 where the electronic controller 26 has determined that the lead vehicle 50 is currently rapidly decelerating corresponding to a hard braking condition.

The no braking image 82a, the light braking image 82b, the medium braking image 82c and the hard braking image 82d can be displayed in any of the braking condition display areas 36c, 36d and 40d as controlled by the electronic controller 26.

Sixth Embodiment

Referring now to FIGS. 28a-28d, a plurality of braking condition images in accordance with a sixth embodiment will now be explained. In view of the similarity between the first and sixth embodiments, the parts of the sixth embodiment that are identical to the parts of the first embodiment will be given the same reference numerals as the parts of the first embodiment. Moreover, the descriptions of the parts of the sixth embodiment that are identical to the parts of the first embodiment may be omitted for the sake of brevity.

In the sixth embodiment, a sixth set of braking condition images are described. Each of the braking condition images of the sixth embodiment are defined by increases in illumination with the braking condition display areas 36a, 36b, 40b and 40c. Each of the plurality of braking condition images is described below. Specifically, the sixth set of braking condition images includes a no braking image 84a, a light braking image 84b, a medium braking image 84c and a hard braking image 84d.

Each of the plurality of braking condition images (the no braking image 84a, the light braking image 84b, the medium braking image 84c and the hard braking image 84d) includes a rectangular frame or outline and a centered triangle with a faux image of the lead vehicle 50'.

Figure 28A:
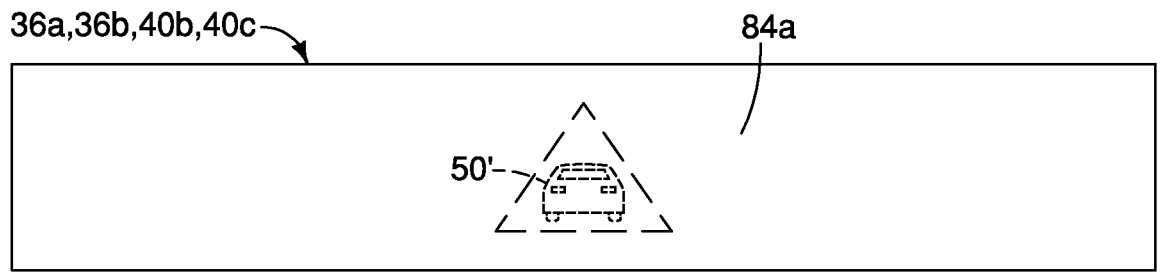
FIG. 28a is a schematic diagram showing a no braking image of a sixth set of braking condition images that, in response to evaluation of data, can be selected by the electronic controller for display in one or more of the above described braking condition display areas in accordance with a sixth embodiment.

As shown in FIG. 28a, the no braking image 84a is blank but can optionally include a faint outline of the faux image of the lead vehicle 50' surrounded a triangle. This corresponds to step S4 in FIG. 4 where the electronic controller 26 has determined that the lead vehicle 50 is not currently decelerating and therefore no braking is detected.

Figure 28B:
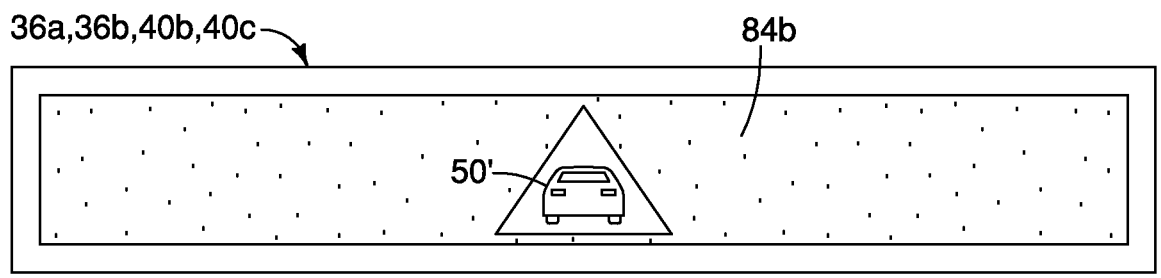
FIG. 28b is a schematic diagram showing a light braking image of the sixth set of braking condition images that, in response to evaluation of data, can be selected by the electronic controller for display in one or more of the above described braking condition display areas in accordance with the sixth embodiment.

As shown in FIG. 28b, the light braking image 84b is depicted with the rectangle being lightly illuminated with a low intensity of light or with a soft color such as a light red or light yellow.

Figure 28C:
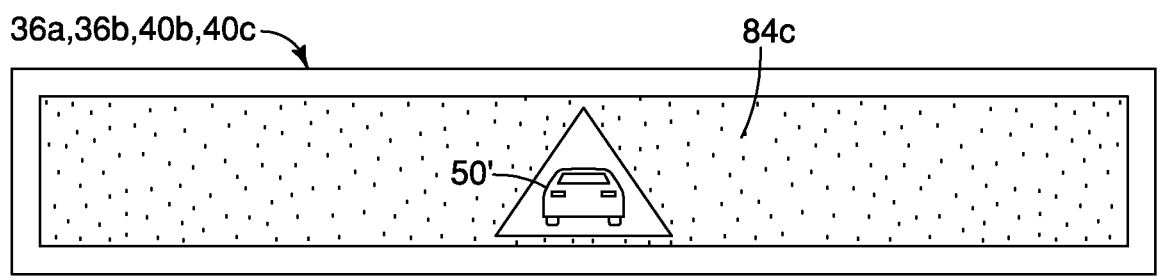
FIG. 28c is a schematic diagram showing a medium braking image of the sixth set of braking condition images that, in response to evaluation of data, can be selected by the electronic controller for display in one or more of the above described braking condition display areas in accordance with the sixth embodiment.

In FIG. 28c, the medium braking image 84c is depicted with the rectangle being more brightly illuminated as compared to the light braking image 84b, with a level light having a level of intensity greater than that of the light braking image 84b or with a color such as a light red or light yellow brighter than that of the light braking image 84b.

Figure 28D:
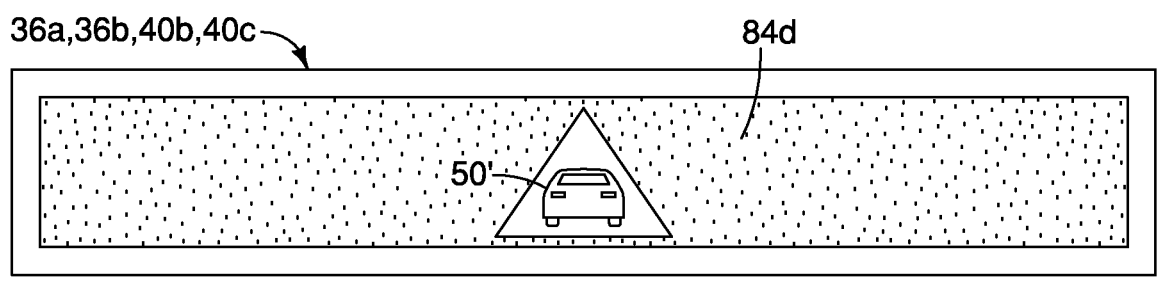
FIG. 28d is a schematic diagram showing a hard braking image of the sixth set of braking condition images that, in response to evaluation of data, can be selected by the electronic controller for display in one or more of the above described braking condition display areas in accordance with the sixth embodiment.

In FIG. 28d, the hard braking image 84d is depicted with the rectangle being more brightly illuminated than the medium braking image 84c, with a light having a level of intensity greater than that of the medium braking image 84c or with a color such as a light red or light yellow that is brighter than that of the medium braking image 84c.

Seventh Embodiment

Referring now to FIGS. 29a-29d, a plurality of braking condition images in accordance with a seventh embodiment will now be explained. In view of the similarity between the first and seventh embodiments, the parts of the seventh embodiment that are identical to the parts of the first embodiment will be given the same reference numerals as the parts of the first embodiment. Moreover, the descriptions of the parts of the seventh embodiment that are identical to the parts of the first embodiment may be omitted for the sake of brevity.

In the seventh embodiment, a seventh set of braking condition images are employed. Each of the braking condition images of the seventh embodiment are defined by changes in the images that are displayed by the electronic controller 26 in each of the braking condition display areas 36c, 36d, 40b and 40d of the displays described above. Each of the plurality of braking condition images is described below. Specifically, the seventh set of braking condition images includes a no braking image 86a, a light braking image 86b, a medium braking image 86c and a hard braking image 86d.

Each of the plurality of braking condition images (the no braking image 86a, the light braking image 86b, the medium braking image 86c and the hard braking image 86d) includes a rectangular frame or outline with a centered faux image of the lead vehicle 50'.

Figure 29A:
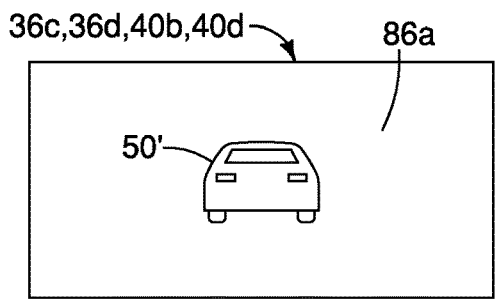
FIG. 29a is a schematic diagram showing a no braking image of a seventh set of braking condition images that, in response to evaluation of data, can be selected by the electronic controller for display in one or more of the above described braking condition display areas in accordance with a seventh embodiment.

As shown in FIG. 29a, the no braking image 86a is blank except that the faux image of the lead vehicle 50' can optionally be shown. This corresponds to step S4 in FIG. 4 where the electronic controller 26 has determined that the lead vehicle 50 is not currently decelerating and therefore no braking is detected.

Figure 29B:
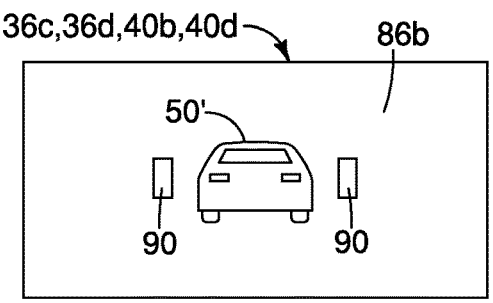
FIG. 29b is a schematic diagram showing a light braking image of the seventh set of braking condition images that, in response to evaluation of data, can be selected by the electronic controller for display in one or more of the above described braking condition display areas in accordance with the seventh embodiment.

As shown in FIG. 29b, the light braking image 86b is depicted with the rectangle includes a pair of lines 90, one on each side of the faux image of the lead vehicle 50'. The lines 90 are lightly illuminated with a low intensity of light or with a soft color such as a light red or light yellow.

Figure 29C:
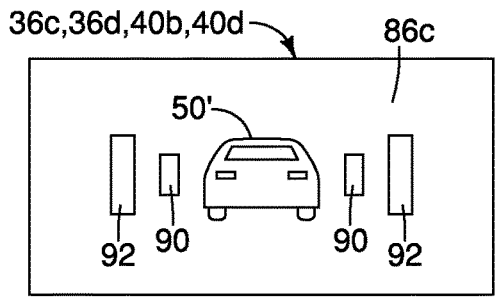
FIG. 29c is a schematic diagram showing a medium braking image of the seventh set of braking condition images that, in response to evaluation of data, can be selected by the electronic controller for display in one or more of the above described braking condition display areas in accordance with the seventh embodiment.

In FIG. 29c, the medium braking image 86c is depicted with the rectangle now having the pair of lines 90 as in the light braking image 86b, and a second pair of lines 92 adjacent to each of the lines 90 with the faux image of the lead vehicle 50' being centered between the lines 90 and the second lines 92. The lines 90 and 92 brightly illuminated as compared to the lines 90 in the light braking image 88b, with a level light having a level of intensity greater than that of the light braking image 88b or with a color such as a light red or light yellow brighter than that of the light braking image 86b.

Figure 29D:
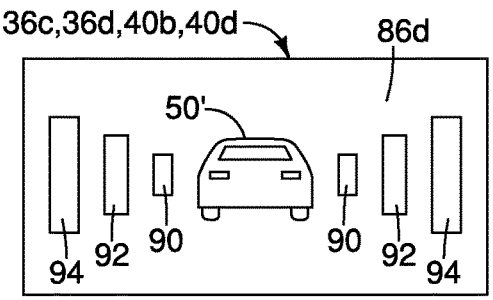
FIG. 29d is a schematic diagram showing a hard braking image of the seventh set of braking condition images that, in response to evaluation of data, can be selected by the electronic controller for display in one or more of the above described braking condition display areas in accordance with the seventh embodiment.

In FIG. 29d, the hard braking image 86d is depicted with the rectangle including the lines 90, the second lines 92 and third lines 94. The lines 90, 92 and 94 are more brightly illuminated than the medium braking image 86c, with a light having a level of intensity being greater than that of the medium braking image 86c or with a color such as a light red or light yellow that is brighter than that of the medium braking image 86c.

Eighth Embodiment

Referring now to FIGS. 30a-30d, a plurality of braking condition images in accordance with an eighth embodiment will now be explained. In view of the similarity between the first and eighth embodiments, the parts of the eighth embodiment that are identical to the parts of the first embodiment will be given the same reference numerals as the parts of the first embodiment. Moreover, the descriptions of the parts of the eighth embodiment that are identical to the parts of the first embodiment may be omitted for the sake of brevity.

In the eighth embodiment, an eighth set of braking condition images are described. Each of the braking condition images of the eighth embodiment are defined by changes in the number of illumination parts 54 that are displayed by the electronic controller 26 in each of the braking condition display areas 36c, 36d, 40b and 40d of the displays described above. Each of the plurality of braking condition images is described below. Specifically, the eighth set of braking condition images includes a no braking image 88a, a light braking image 88b, a medium braking image 88c and a hard braking image 88d.

Each of the plurality of braking condition images (the no braking image 88a, the light braking image 88b, the medium braking image 88c and the hard braking image 88d) includes a rectangular frame or outline with a plurality of illumination parts 54 (circular or dot shaped) that are arranged in a grid with defining a plurality of vertically arranged illumination parts 54 and a plurality of horizontally arranged illumination parts 54.

Figure 30A:
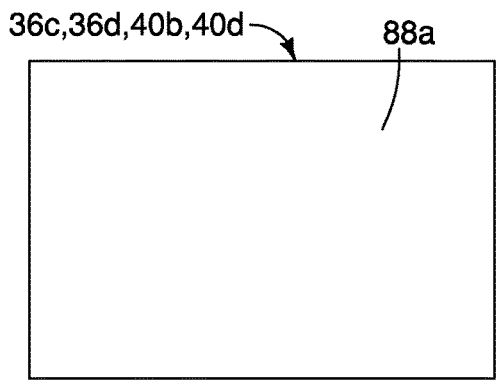
FIG. 30a is a schematic diagram showing a no braking image of an eighth set of braking condition images that, in response to evaluation of data, can be selected by the electronic controller for display in one or more of the above described braking condition display areas in accordance with an eighth embodiment.

As shown in FIG. 30a, the no braking image 88a is blank. This corresponds to step S4 in FIG. 4 where the electronic controller 26 has determined that the lead vehicle 50 is not currently decelerating and therefore no braking is detected.

Figure 30B:
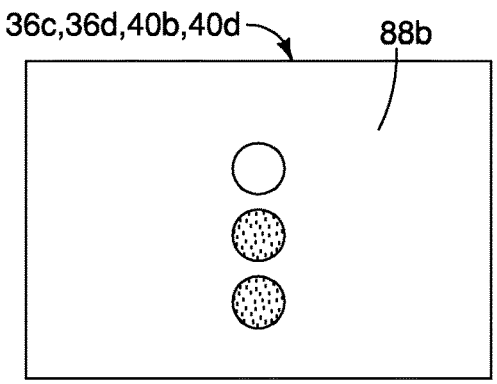
FIG. 30b is a schematic diagram showing a light braking image of the eighth set of braking condition images that, in response to evaluation of data, can be selected by the electronic controller for display in one or more of the above described braking condition display areas in accordance with the eighth embodiment.

As shown in FIG. 30b, the light braking image 86b is depicted with three vertically arranged ones of the illumination parts 54 being illuminated with the topmost one of the illumination parts 54 being illuminated with a level of illumination that is different from the lower two illumination parts 54 or is illuminated with a different color that the lower two illumination parts 54, thereby defining the light braking image 88*b*. This corresponds to step S6 in FIG. 4 where the electronic controller 26 has determined that the lead vehicle 50 is undergoing light deceleration and therefore is in a light braking condition.

Figure 30C:
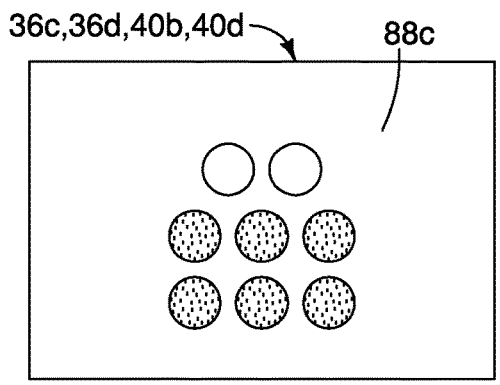
FIG. 30c is a schematic diagram showing a medium braking image of the eighth set of braking condition images that, in response to evaluation of data, can be selected by the electronic controller for display in one or more of the above described braking condition display areas in accordance with the eighth embodiment.

In FIG. 30*c*, the medium braking image 88*c* is depicted with eight of the illumination parts 54 being illuminated. The two of the illumination parts 54 in a top row are illuminated with a different color or a different light intensity than the lower two rows of three illumination parts 54, thereby defining the medium braking image 88*c*. This corresponds to step S8 in FIG. 4 where the electronic controller 26 has determined that the lead vehicle 50 is undergoing medium deceleration and therefore is in a medium braking condition.

Figure 30D:
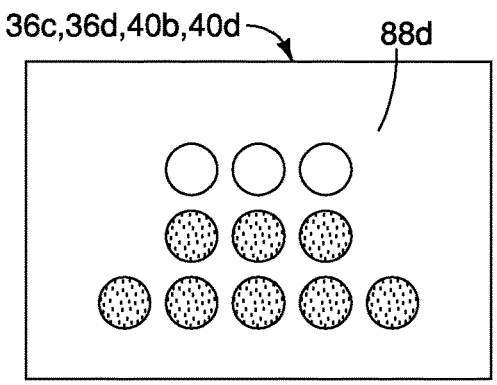
FIG. 30d is a schematic diagram showing a hard braking image of the eighth set of braking condition images that, in response to evaluation of data, can be selected by the electronic controller for display in one or more of the above described braking condition display areas in accordance with the eighth embodiment.

In FIG. 30*d*, the hard braking image 88*d* is depicted with a top row of three illumination parts 54, a middle row of three illumination parts 54 and a bottom row with five illumination parts 54, all being illuminated defining the hard braking image 88*d*. The top row of three illumination parts 54 are illuminated with a differing light intensity or a different color than the middle row and bottom row. This corresponds to step S10 in FIG. 4 where the electronic controller 26 has determined that the lead vehicle 50 is undergoing rapid (hard) deceleration and therefore is in a hard braking condition.

Ninth Embodiment

Figure 31:
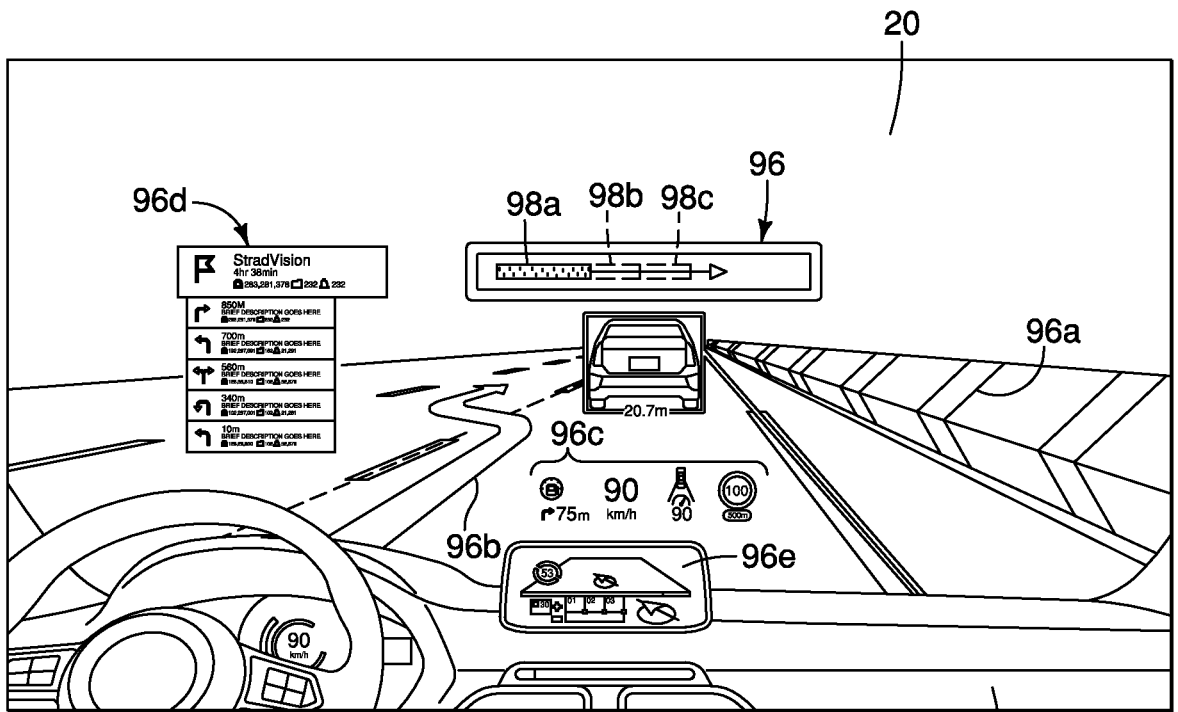
FIG. 31 is a view of an HUD projected to the windshield of the host vehicle displaying augmented reality that includes a driver suggested course of action, host vehicle data and lead vehicle data including a braking condition display area in accordance with a ninth embodiment.

Referring now to FIG. 31, an augmented reality an augmented reality display projected by the HUD 36 to the windshield 20 in accordance with a ninth embodiment will now be explained. In view of the similarity between the first and ninth embodiments, the parts of the ninth embodiment that are identical to the parts of the first embodiment will be given the same reference numerals as the parts of the first embodiment. Moreover, the descriptions of the parts of the ninth embodiment that are identical to the parts of the first embodiment may be omitted for the sake of brevity.

The electronic controller 26 processes data from, for example, the speed sensor 28, the radar device 30, other vehicle control systems 34, a GPS system (not shown) and the eye tracking sensor 38 that senses location of a vehicle operator's eyes and uses such information to operate the HUD 36 and display a variety of information and data onto the windshield 20 of the host vehicle 10. As is well known, augmented reality (AR) is used to place digital information on top of the real world (the view through the windshield 20).

In addition to showing the road ahead, the electronic controller 26 gathers information and informs the vehicle operator about foreign objects, other vehicles, pedestrians, and cyclists on the road ahead.

The electronic controller uses the eye tracking sensor 38 to operate the HUD 36 to project images correctly regardless of where the vehicle operator's eyes are focused while looking at or through the windshield 20. If the vehicle operator's head has turned, the electronic controller 26 adjusts the location of the information displayed by the HUD 36 to compensate for the vehicle operator's eye movement.

The electronic controller 26 evaluates received data to create the augmented reality projected to the windshield 20 by the HUD 36. The augmented reality display in FIG. 31 includes a braking condition display area 96, warning arrows 96*a*, an arrow 96*b*, lead vehicle data 96*c*, approaching road related alerts 96*d* and host vehicle related data 96*e*. The braking condition display area 96 can be supplied with many of the braking condition images described above, as determined using the logic set forth in FIG. 4. One example shown in the braking condition display area 96 of FIG. 31, is a linear set of braking condition images where a first short line 98*a* (a light braking image) is displayed indicating that the lead vehicle 50 is undergoing light deceleration. A second line 98*b* (longer than the first short line 98*a*) defines a medium braking image. A third line 98*c* longer than both the first and second lines 98*a* and 98*b* defines a hard braking image.

The warning arrows 96*a* overlay a wall to the right of the host vehicle 10 indicating a non-movable obstacle. The arrow 96*b* is an indication of a suggested course of action for the vehicle operator in response to detecting braking of the lead vehicle 50. The lead vehicle data 96*c* can include approximate distance between the host vehicle 10 and the lead vehicle 50, speed of the lead vehicle 50 and other information. The approaching road related alerts 96*d* can include a list of obstacle, bicyclist(s), etc. and the approximate distances to each of the obstacles.

Tenth Embodiment

Figure 32:
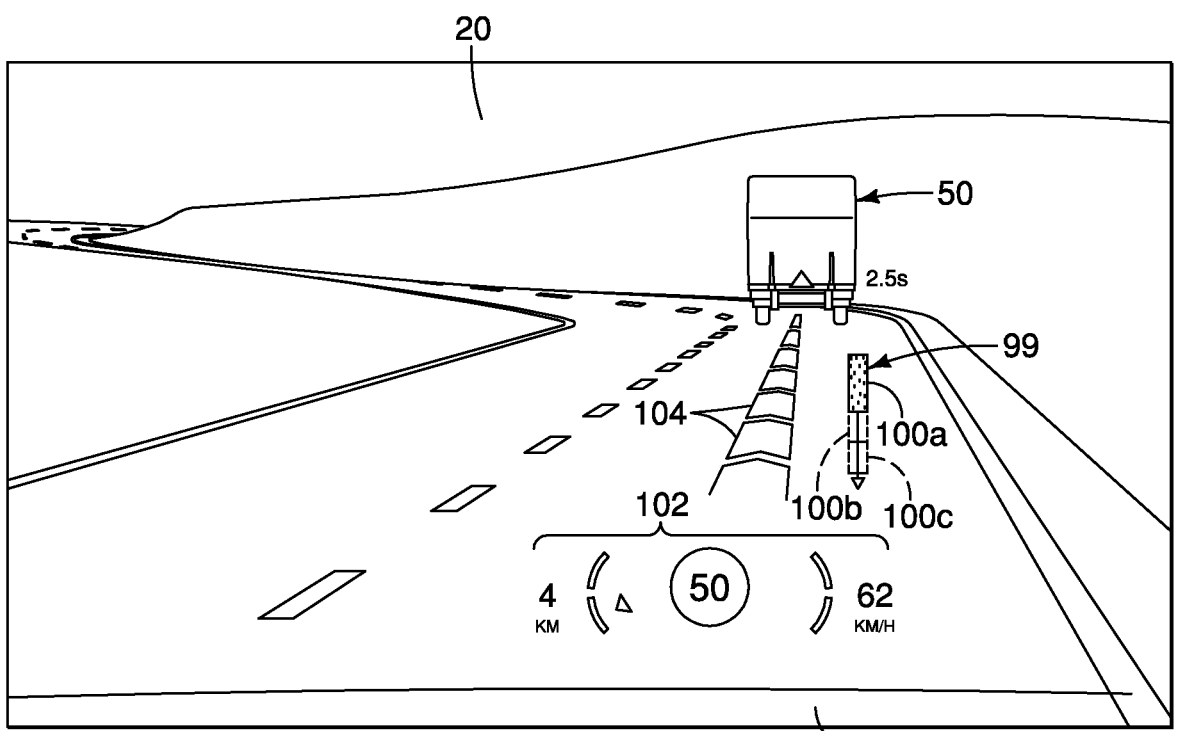
FIG. 32 is another view of an HUD projected to the windshield of the host vehicle displaying augmented reality with host vehicle data and lead vehicle data including a braking condition display area in accordance with a tenth embodiment.

Referring now to FIG. 32, another augmented reality display projected by the HUD 36 to the windshield 20 in accordance with a tenth embodiment will now be explained. In view of the similarity between the first and tenth embodiments, the parts of the tenth embodiment that are identical to the parts of the first embodiment will be given the same reference numerals as the parts of the first embodiment. Moreover, the descriptions of the parts of the tenth embodiment that are identical to the parts of the first embodiment may be omitted for the sake of brevity.

As described above in the ninth embodiment, the electronic controller 26 processes data from, for example, the speed sensor 28, the radar device 30, other vehicle control systems 34, a GPS system (not shown) and the eye tracking sensor 38 (FIG. 2) that senses location of a vehicle operator's eyes and uses such information to operate the HUD 36 and display a variety of information and data onto the windshield 20 of the host vehicle 10. As is well known, augmented reality (AR) is used to place digital information on top of the real world (the view through the windshield 20).

In addition to showing the road ahead, the electronic controller 26 gathers information and informs the vehicle operator about foreign objects, other vehicles, pedestrians, and cyclists on the road ahead.

The electronic controller 26 evaluates received data to create the augmented reality projected to the windshield 20 by the HUD 36. The augmented reality display in FIG. 32 includes a braking condition display area 99, lead vehicle related data 102, and warning arrows 104. As shown in the braking condition display area 104 of FIG. 32, a linear set of braking condition images can be displayed such as a first short line 100*a* (a light braking image) when the electronic controller 26 determines that the lead vehicle 50 is undergoing light deceleration. A second line 100*b* (longer than the first short line 100*a*) defines a medium braking image and is displayed when the electronic controller 26 determines that the lead vehicle 50 is undergoing medium deceleration. A third line 100*c* longer than both the first and second lines 98*a* and 98*b* defines a hard braking image that is displayed when the electronic controller 26 determines that the lead vehicle 50 is undergoing hard deceleration.

The host vehicle 10 includes many conventional components that are well known in the art. Since such conventional components are well known in the art, these components, structures and vehicle elements will not be discussed or illustrated in detail herein. Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the lead vehicle braking warning system. Accordingly, these terms, as utilized to describe the present invention should be interpreted relative to a vehicle equipped with the lead vehicle braking warning system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A lead vehicle braking warning system, comprising:
    a host vehicle;
    a speed sensor installed to the host vehicle measuring current speed of the host vehicle;
    a detector installed to the host vehicle that detects current speed of a lead vehicle relative to the speed of the host vehicle, the lead vehicle being located forward of the host vehicle;
    a display installed to the host vehicle within view of a vehicle operator of the host vehicle, the display having a braking condition display area configured to display each of a plurality of braking conditions of the lead vehicle; and
    an electronic controller installed to the host vehicle and being in electronic communication with the speed sensor, the detector and the display, the electronic controller determining acceleration/deceleration of the lead vehicle and determining whether or not the lead vehicle is currently decelerating at a rate corresponding to one of the plurality of braking conditions of the lead vehicle, determining which one of the plurality of braking conditions is currently being experienced by the lead vehicle and displaying information identifying the one of the plurality of braking conditions of the lead vehicle within the braking condition display area in response to signals from the speed sensor and the detector.

2. The lead vehicle braking warning system according to claim 1, wherein
    the plurality of braking conditions includes at least a light braking condition and a hard braking condition where the light braking condition is determined by the electronic controller in response to relatively slow rate of deceleration of the lead vehicle relative to the host vehicle indicating light braking by an operator of the lead vehicle, and where the hard braking condition is determined by the electronic controller in response to a rapid rate of deceleration of the lead vehicle relative to the host vehicle indicating hard braking by the operator of the lead vehicle.

3. The lead vehicle braking warning system according to claim 2, wherein
    the electronic controller displays a light braking image in the braking condition display area of the display in response to determining that the lead vehicle is undergoing the light braking condition; and
    the electronic controller displays a hard braking image in the braking condition display area of the display in response to determining that the lead vehicle is undergoing the hard braking condition, with the hard braking image being more luminous that the light image.

4. The lead vehicle braking warning system according to claim 2, wherein
    the plurality of braking conditions further includes at least a medium braking condition where the medium braking condition is determined by the electronic controller in response to a deceleration rate of the lead vehicle relative to the host vehicle that is approximately midway between the relatively slow rate of deceleration of the lead vehicle and the rapid rate of deceleration of the lead vehicle.

5. The lead vehicle braking warning system according to claim 4, wherein
    the electronic controller displays a light braking image in the braking condition display area of the display in response to determining that the lead vehicle is undergoing the light braking condition;

the electronic controller displays a medium braking image in the braking condition display area of the display in response to determining that the lead vehicle is undergoing the medium braking condition; and the electronic controller displays a hard braking image in the braking condition display area of the display in response to determining that the lead vehicle is undergoing the hard braking condition, with the medium braking image being more luminous that the light braking image and the hard braking image being more luminous that the medium braking image.

6. The lead vehicle braking warning system according to claim 1, wherein
the display is a heads-up display projected on an inner surface of a windshield of the host vehicle.

7. The lead vehicle braking warning system according to claim 1, wherein
the display is located within a portion of an instrument cluster of the dashboard of the host vehicle.

8. The lead vehicle braking warning system according to claim 1, wherein
the display is located along a portion of the dashboard with at least a portion of the display extending along and above an instrument cluster of the dashboard of the host vehicle.

9. The lead vehicle braking warning system according to claim 1, wherein
the display is located along a lower edge of a windshield of the host vehicle.

10. The lead vehicle braking warning system according to claim 1, wherein
the plurality of braking conditions of the lead vehicle displayed on the braking condition display area of the display by the electronic controller include: a light braking image corresponding to a light braking condition of the lead vehicle; a medium braking image corresponding to a medium braking condition of the lead vehicle; and a hard braking image corresponding to a hard braking condition of the lead vehicle.

11. The lead vehicle braking warning system according to claim 10, wherein
the braking condition display area includes a plurality of illumination parts where the light braking image includes less than half of the plurality of illumination parts being illuminated, the medium braking image includes at least half of the plurality of illumination parts being illuminated and the hard braking image includes all of the plurality of illumination parts being illuminated.

12. The lead vehicle braking warning system according to claim 11, wherein
the plurality of illumination parts are arranged such that each illumination part is adjacent to at least one other of the illumination parts such that each of the light braking image, the medium braking image and the hard braking image defining an overall arcuate shape.

13. The lead vehicle braking warning system according to claim 11, wherein
the plurality of illumination parts are arranged such that each illumination part is adjacent to at least one other of the illumination parts such that each of the light braking image, the medium braking image and the hard braking image is defined by respective linearly arranged illumination.

14. The lead vehicle braking warning system according to claim 11, wherein
each of the plurality of illumination parts have a circular or dot-like appearance.

15. The lead vehicle braking warning system according to claim 11, wherein
the plurality of illumination parts are linearly arranged relative to one another such that each of the light braking image, the medium braking image and the hard braking image has the appearance of corresponding straight lines with differing corresponding lengths.

16. The lead vehicle braking warning system according to claim 10, wherein
each of the light braking image, the medium braking image and the hard braking image includes an image representing the lead vehicle where the image representing the lead vehicle can be illuminated with a plurality of levels of illumination or differing colors such that the light braking image is indicated within the braking condition display area the image representing the lead vehicle is illuminated with a first color or a first light intensity, the medium braking image is indicated within the braking condition display area by the image representing the lead vehicle being illuminated with a second color or a second light intensity where the second color or second light intensity is brighter than the first color or the first light intensity, respectively, and the hard braking image is indicated within the braking condition display area the image representing the lead vehicle is illuminated with a third color or a third light intensity where the third color or third light intensity is brighter than the second color or the second light intensity, respectively.

17. The lead vehicle braking warning system according to claim 10, wherein
each of the light braking image, the medium braking image and the hard braking image includes an image representing lane divide lines with a lead vehicle image being between the lane divide lines when displayed within the braking condition display area, where the lane divide lines are shown with differing colors or levels of illumination such that the light braking image is indicated with the lane divide lines being illuminated with a first color or a first light intensity, the medium braking image is indicated with the lane divide lines being illuminated with a second color or a second light intensity, respectively, where the second color or second light intensity is brighter than the first color or the first light intensity, respectively, and the hard braking image is indicated with the lane divide lines being illuminated with a third color or a third light intensity, respectively, where the third color or third light intensity is brighter than the second color or the second light intensity, respectively.

18. The lead vehicle braking warning system according to claim 10, wherein
the braking condition display area includes a peripheral frame that is illuminated with an of a plurality of differing colors or differing levels of illumination such that the light braking image is indicated with the peripheral frame being illuminated with a first color or a first light intensity, the medium braking image is indicated with the peripheral frame being illuminated with a second color or a second light intensity, respectively, where the second color or second light intensity is brighter than the first color or the first light intensity, respectively, and the hard braking image is indicated with the peripheral frame being illuminated with a third color or a third light intensity, respectively, where the third color or third light intensity is brighter than the second color or the second light intensity, respectively.

* * * * *